United States Patent [19]
Inada et al.

[11] Patent Number: 5,954,784
[45] Date of Patent: Sep. 21, 1999

[54] ENGINE MISFIRE DIAGNOSIS APPARATUS

[75] Inventors: Yoshihiro Inada, Sagamihara; Youichi Kishimoto, Chigasaki, both of Japan

[73] Assignee: Nissan Motor Co., Ltd., Kanagawa, Japan

[21] Appl. No.: 08/895,379

[22] Filed: Jul. 16, 1997

[30] Foreign Application Priority Data

Jul. 16, 1996 [JP] Japan ................................. 8-186260

[51] Int. Cl.⁶ .......................... F02P 17/00; G01M 15/00
[52] U.S. Cl. ........................... 701/110; 73/116; 73/117.3; 123/419; 123/436
[58] Field of Search .................................. 73/116, 117.2, 73/117.3, 118.1; 123/419, 425, 436; 701/110, 111

[56] References Cited

U.S. PATENT DOCUMENTS

| | | | |
|---|---|---|---|
| 4,302,814 | 11/1981 | Full et al. | 73/116 |
| 4,418,669 | 12/1983 | Johnson et al. | 123/436 |
| 5,197,325 | 3/1993 | Tamura et al. | 73/117.3 |
| 5,345,817 | 9/1994 | Grenn et al. | 73/117.3 |
| 5,345,911 | 9/1994 | Kadowaki et al. | 123/436 |
| 5,347,857 | 9/1994 | Mirhakimi et al. | 73/118.1 |
| 5,481,909 | 1/1996 | Deutsch et al. | 73/117.3 |
| 5,726,892 | 3/1998 | Tang et al. | 123/419 |

FOREIGN PATENT DOCUMENTS

| | | |
|---|---|---|
| 4-101071 | 4/1992 | Japan . |
| 4-113244 | 4/1992 | Japan . |

*Primary Examiner*—George Dombroske
*Attorney, Agent, or Firm*—McDermott, Will & Emery

[57] ABSTRACT

Start points of a misfire determining interval in the cylinders of an engine are specified by counting Pos signals starting from the appearance of a Ref signal in a specific cylinder. The Pos signals output from the Ref signal in each cylinder to the start point of the misfire determining interval are also counted as RGPHS after engine startup, and a shift of the misfire determining interval is detected by comparing for example the sum total of RGPHS for all cylinders and the sum total on the immediately preceding occasion. Correction of the misfire determining interval by a learnt value is stopped according to this shift. Preferably, correction of the misfire determining interval by the learnt value is restarted after making all misfire determining intervals the same by correcting for the shift.

8 Claims, 19 Drawing Sheets

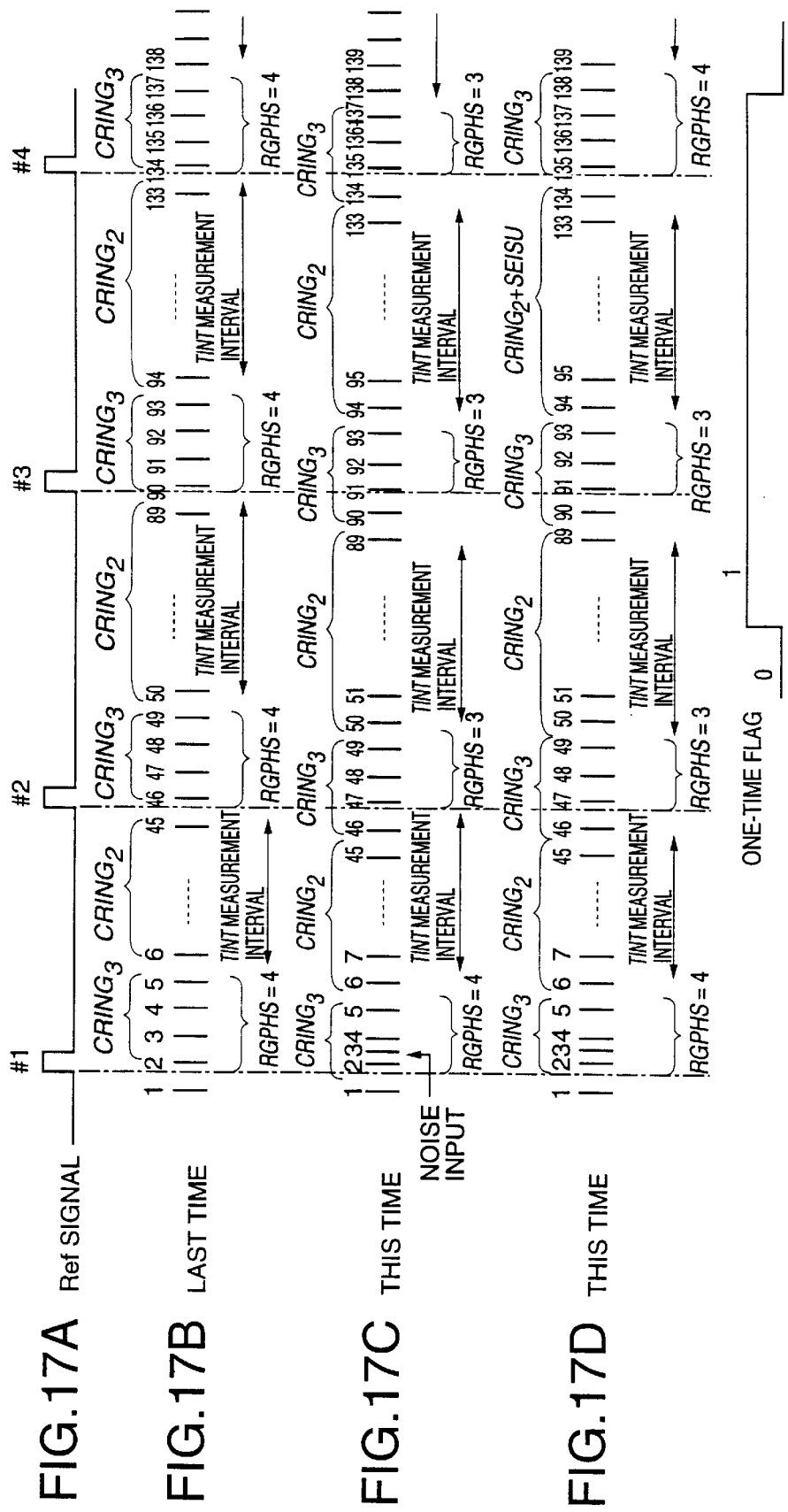

ENGINE MISFIRE DIAGNOSIS APPARATUS

The contents of Tokugan Hei 8-186260, with a filing date of Jul. 16,1997 in Japan, are hereby incorporated by reference.

FIELD OF THE INVENTION

This invention relates to diagnosis of engine misfiring.

BACKGROUND OF THE INVENTION

A device which detects fluctuations in the rotation speed of an automobile engine crankshaft, and diagnoses whether a specific cylinder of the engine has misfired, is disclosed for example in Tokkai Hei 4-113244 published by the Japanese Patent Office in 1992. This apparatus has a magnetic pickup facing the teeth of a ring gear which rotates together with the crankshaft. The magnetic pickup outputs a pulse signal (Pos signal) which varies according to the passage of the gear teeth. In other words, a Pos signal is output at a predetermined small rotation angle of the crankshaft. The apparatus detects changes in the rotation period of the crankshaft by comparing the time which was necessary to count a predetermined number of Pos signals.

In the case of a six cylinder engine, ignition and combustion occur once in each of the cylinders during the time that the crankshaft rotates twice. If the numbers #1 to #6 are assigned to the cylinders in order of firing sequence, combustion takes place at the same crank angle for cylinders #1 and #4, #2 and #5, and #3 and #6. During the first rotation, the cylinders #1 to #3 fire, and during the second rotation, the cylinders #4 to #6 fire. There are therefore three tooth count intervals during a 360 degree crank angle rotation.

The count start point of the number of teeth in these intervals is determined according to a Ref signal. The Ref signal is detected by a crank angle sensor which detects the rotation of a camshaft of the engine. The crank angle sensor is a sensor which outputs a Ref signal, for example at compression top dead center (TDC) of each cylinder, by detecting a specific rotation angle of the camshaft. Consequently the count start point of the number of teeth is set when a fixed number of Pos signals are counted after output of the Ref signal. When it comes to the start point, the aforesaid predetermined number of Pos signals are counted and the time required to count this predetermined number of Pos signals is set as a misfire determining interval TINT. This value is compared with the interval TINT measured for the immediately preceding occasion when a misfire was determined for the same cylinder, and when this difference is large, it is determined that this cylinder has misfired.

However even when the crankshaft rotates at a fixed speed, a difference may appear in the misfire determining interval TINT depending on the interval due to inconsistencies in the manufacture of the ring gear.

In this connection, Tokkai Hei 4-101071 published by the Japanese Patent Office published in 1992 discloses how the precision of the teeth of the ring gear is learnt for each cylinder, and the measured misfire determining interval TINT is corrected by this learnt value. This learnt value is stored for example in a back up RAM with which a control unit is provided.

In this case also, due to an error in detecting the gear teeth by the magnetic pick up or due to infiltration of noise, it may occur that the TINT measuring start point for the same cylinder may be shifted by an amount equivalent to gear tooth. As a result, the TINT measurement interval shifts, so highly precise data are not obtained even if the measured value is corrected by the learnt value stored in the RAM.

In the case of a six cylinder engine, the change in rotation due to a misfire in the high rotation speed area is of the order of 0.1%, this value becoming smaller as the number of cylinders increases. Hence even when there is a shift of one gear tooth in the measured interval, there is a large effect on the diagnosis result.

SUMMARY OF THE INVENTION

It is therefore an object of this invention to detect a shift in the TINT measurement interval with high precision.

It is a further object of this invention to appropriately correct a shift in the TINT measurement interval.

It is yet a further object of this invention to improve the precision of a misfire determination by TINT measurement.

In order to achieve the above objects, this invention provides an engine misfire diagnosis apparatus which measures the time corresponding to a combustion process in each cylinder of a multi-cylinder engine, and detects a misfire in a cylinder based on a change of the time.

The apparatus comprises a mechanism for outputting a Pos signal corresponding to the passage of a tooth of a gear which rotates together with the engine, a mechanism for outputting a Ref signal corresponding to a specific stroke position of each cylinder, a mechanism for specifying a given tooth of the gear corresponding to a start point of a misfire determining interval for each cylinder by counting a predetermined number of Pos signals starting from the appearance of a Ref signal in a specific cylinder, a mechanism for counting a number RGPHS of Pos signals from the Ref signal in each cylinder to the start point in each cylinder, a timer for measuring a required time from the start point until the predetermined number of Pos signals has been counted, a mechanism for correcting the required time by a learnt value, a mechanism for determining a misfire in a cylinder based on the required time after correction, a mechanism for calculating a sum total for a plurality of cylinders of the number RGPHS counted by the counting mechanism, a a mechanism for storing the sum total, a mechanism for detecting a difference of a tooth of the gear corresponding to a start point based on a difference between the sum total stored in the storing mechanism and a sum total calculated on the next occasion by the calculating mechanism for the same plurality of cylinders, and a mechanism for stopping correction of the required time by the correcting mechanism when the difference has been detected.

It is preferable that the Pos signal outputting mechanism comprises a mechanism for outputting Pos signals according to the passage of teeth of a ring gear linked to a crankshaft of the engine.

It is also preferable that the specifying mechanism comprises a mechanism for specifying a measuring start point for the specific cylinder by counting a first predetermined number of Pos signals from a Ref signal in the specific cylinder, a mechanism for setting a time from the measuring start point to when counting of a second predetermined number of Pos signals has been completed as a measuring interval of the timer, a mechanism for specifying a measuring start point for a following cylinder by counting a third predetermined number of Pos signals after the end of the measuring interval, and a mechanism for specifying a measuring start point for another cylinder by alternately counting the second predetermined number of Pos signals and a third predetermined number of Pos signals from the measuring start point for the following cylinder.

It is also preferable that the apparatus further comprises a mechanism for computing an average value of the number RGPHS of Pos signals per cylinder from the sum total of the number RGPHS of Pos signals for the plurality of cylinders, a mechanism for correcting a start point of a cylinder based on a difference between the average value and an average value on the immediately preceding occasion when the engine was running, and a mechanism for releasing the stopping of correction of the required time by the learnt value after correction of the start point.

In this case, it is further preferable that the apparatus further comprises a mechanism for stopping detection of a difference of the tooth by the detecting mechanism for a predetermined number of engine rotations after correction of the start point.

It is also preferable that the measuring start point correcting mechanism comprises a mechanism for calculating an average value of the number RGPHS of Pos signals, a mechanism for storing the average value, a mechanism for comparing the absolute value of a difference between the stored average value and a newly calculated average value with a reference value, and a mechanism for correcting the second predetermined number once based on the difference when the absolute value is larger than the reference value.

The details as well as other features and advantages of this invention are set forth in the remainder of the specification and are shown in the accompanying drawings.

BRIEF DESCRIPTION OF THE DRAWINGS

FIGS. 17A–17D are timing charts describing a misfire diagnosis performed by the misfire diagnosis apparatus.

DESCRIPTION OF THE PREFERRED EMBODIMENTS

Figure 1A:
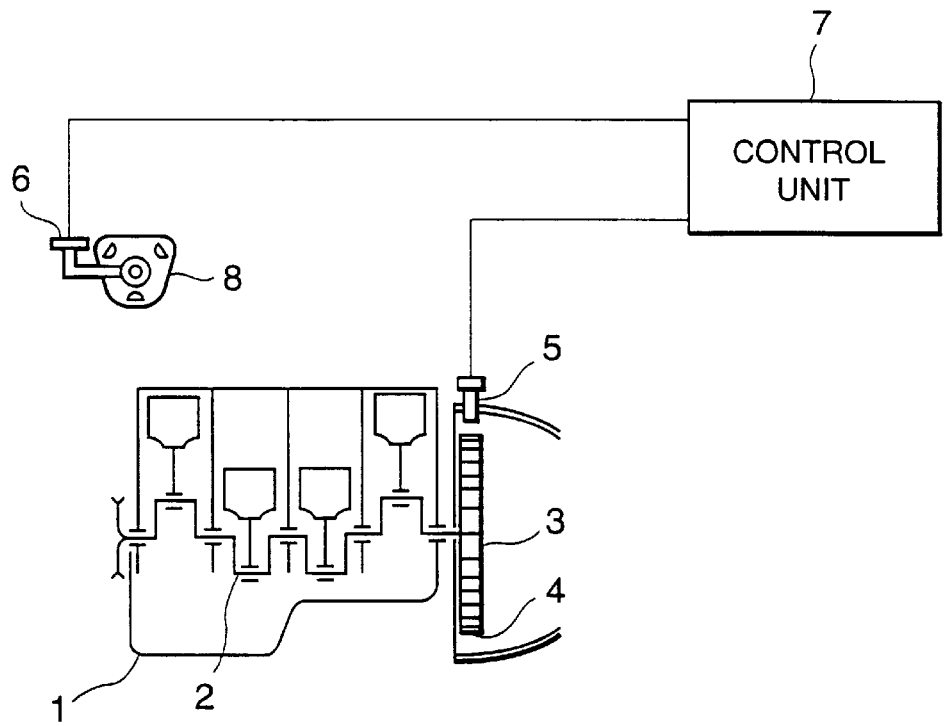
FIGS. 1A and 1B are schematic diagrams of a misfire diagnosis apparatus according to this invention.

Referring to FIG. 1A of the drawings, a fly wheel 3 is attached to the edge of a crankshaft 2 of a V type six cylinder, four stroke cycle engine 1. A ring gear 4 is formed on the outer circumference of the flywheel 3, and a magnetic pick up 5 comprising an iron core and a coil is disposed facing the tooth surface.

Figure 2:
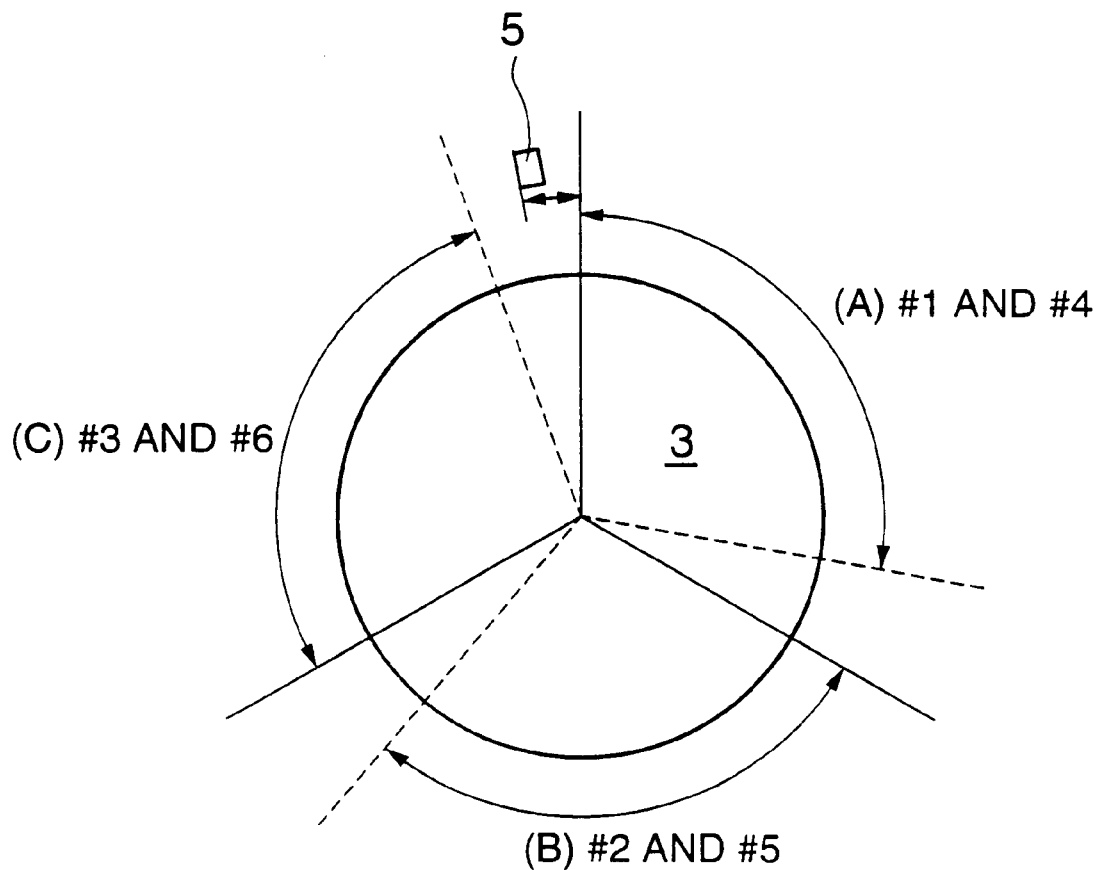
FIG. 2 is a diagram describing a TINT measurement interval according to the misfire diagnosis apparatus.

When the crankshaft 2 turns, the teeth of the gear ring 4 interrupt the magnetic field generated by the core of the magnetic pickup 5, and an alternating current is induced by the variation of magnetic force in the coil of the magnetic pickup 5. This alternating current signal is converted into an ON/OFF pulse of a rectangular wave formed in a control unit 7, and is used as a crank angle signal (Pos signal). A crank angle sensor 6 such as is known in the art is installed in a camshaft assembly 8 which is driven by the crankshaft 2. The crank angle sensor 6 detects a predetermined rotation reference position set for each cylinder, and a reference position signal (Ref signal) is input to the control unit 7. Taking the point at which a predetermined number CRING, of Pos signals from the appearance of the Ref signal of cylinder #1 have been counted by the crank angle sensor 6 as a starting point, the control unit 7 measures a misfire determining interval TINT for each cylinder as shown in FIG. 2. The misfire determining interval TINT is the time required by the crankshaft 2 to turn through a predetermined angle, and it is measured as a time necessary for a predetermined number of teeth of the ring gear to pass the magnetic pickup 5.

In a four stroke cycle, six cylinder engine, combustion takes place in three cylinders during one rotation. In FIG. 2, #1 to #6 are cylinder numbers assigned in the ignition sequence.

The interval (A) corresponds to the combustion process in cylinders #1 and #4. The intervals (B) and (C) respectively correspond to the combustion process in cylinders #2 and #5 and cylinders #3 and #6.

Next, the process of measuring TINT will be described with reference to FIG. 3.

(a) After an ignition switch is switched from OFF to ON, the number of Pos signals is counted starting from the Ref signal of cylinder #1. Measurement of TINT begins when a first predetermined number $CRING_1$ of Pos signals has been counted.

(b) From this starting point, Pos signals are counted until a second predetermined number $CRING_2$ is reached. The time required for this is taken as the misfire determining interval TINT.

(c) Pos signals are then counted up to a third predetermined number $CRING_3$. When counting is finished, TINT measurement for the next cylinder is started.

(d) Subsequently, the procedures of (b) and (c) are repeated to measure TINT.

Figure 4:
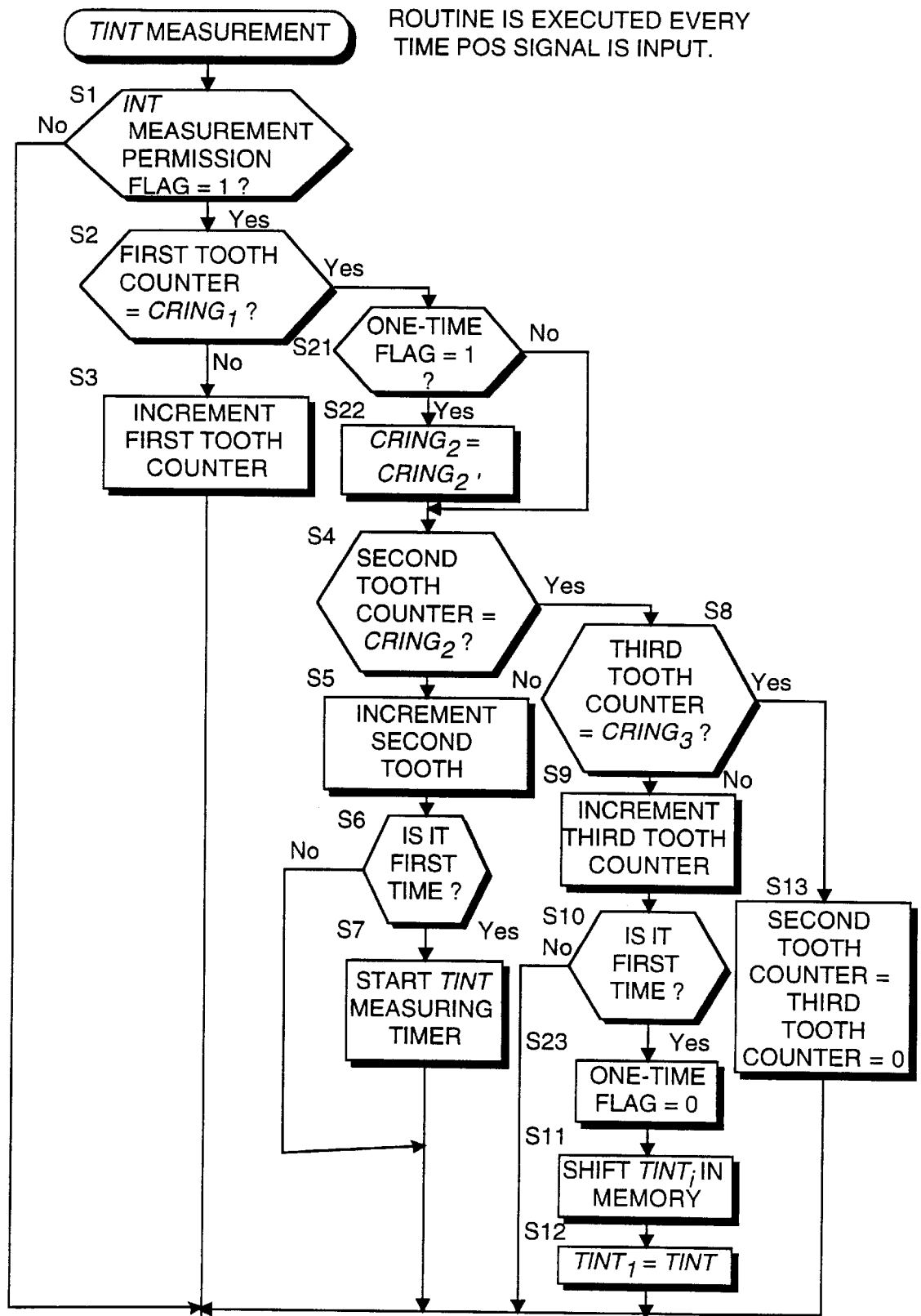
FIG. 4 is a flowchart describing a TINT measurement process performed by the misfire diagnosis apparatus.

The above process is performed by the control unit 7 and is described in detail in a flowchart of FIG. 4.

The process is executed every time a Pos signal is input.

First, in a step S1, a TINT measurement permission flag is determined. The initial value of this flag is 0, and when the Ref signal for cylinder #1 appears after the ignition switch is changed from OFF to ON, the flag is set to "1".

When the TINT measurement permission flag is "1", the routine proceeds to a step S2, and a first tooth counter is compared with the first predetermined number $CRING_1$. Together with a second tooth counter and third tooth counter mentioned hereafter, the first tooth counter is a parameter for counting the number of times a Pos signal is input, and its initial value is 0. When the first tooth counter is not equal to $CRING_1$, the first tooth counter is incremented in a step S3, and the routine is terminated.

As this routine is performed each time a Pos signal is input, the first tooth counter becomes equal to $CRING_1$ when the Pos signal has been input $CRING_1$ times. In this case, the process proceeds from the step S2 to the step S21.

In the step S21, it is determined whether or not a one-time flag is "1". This one-time flag will be described later. The initial value of the one-time flag is "0".

Therefore, the first time that the first tooth counter becomes equal to $CRING_1$ in the step S2, the routine proceeds from the step S21 to a step S4. The case where the one-time flag is "1" will be described hereafter.

In the step S4, the second tooth counter is compared with the second predetermined number $CRING_2$. The initial value of the second tooth counter is 0. When the second tooth counter is not equal to $CRING_2$, the second tooth counter is incremented in a step 5. In a step S6, it is determined whether or not the processing of the step S5 was performed for the first time. When it was performed for the first time, the routine proceeds to a step S7, a TINT measuring timer is started and the routine terminates. When it is not performed for the first time, the routine is immediately terminated.

In this way, after the TINT measuring timer is started, the second tooth counter is incremented in the step S5 each time a Pos signal is input. Subsequently when the second tooth counter becomes equal to $CRING_2$ in the step S4, the routine proceeds to a step S8.

In the step S8, the third tooth counter is compared with the third predetermined number $CRING_3$. The initial value of the third tooth counter is 0. When the third tooth counter is not equal to $CRING_3$, the third tooth counter is incremented in a step S9.

Next, in a step S10, it is determined whether or not the processing of the step S8 was performed for the first time. When it is performed for the first time, the above-mentioned one-time flag is reset to "0" in a step S23.

Next, the processing of steps S11 and S12 is performed. Herein, stored values of the misfire determining interval TINT are first shifted to memories for storing old data. More specifically, a value stored in $TINT_8$ is shifted to $TINT_9$, a value in $TINT_7$ is shifted to $TINT_6$, etc. The current value of the TINT measuring timer is then stored as $TINT_1$. TINT storage memories are provided up to $TINT_9$, and each time the stored values are shifted, the value of $TINT_9$ is erased. When the processing of a step S12 is completed, the routine is terminated.

Subsequently, each time a Pos signal is input, the third tooth counter is incremented in a step S9. In this case as it is determined that as the processing is not being performed for the first time, the routine is terminated without performing the processing of the aforesaid steps S23, S11 and S12.

Hence, when a number of Pos signals equal to $CRING_3$ is input to the control unit 7 after the step S8 and subsequent steps are performed for the first time, the third tooth counter becomes equal to $CRING_3$ in the step S8.

In this case, the routine proceeds to a step S13, the second and third tooth counters are reset to 0, and the routine is terminated.

After the misfire determining interval TINT has been measured 7 times by the above process, the misfire parameters A and B described hereafter can be calculated.

Figure 5:
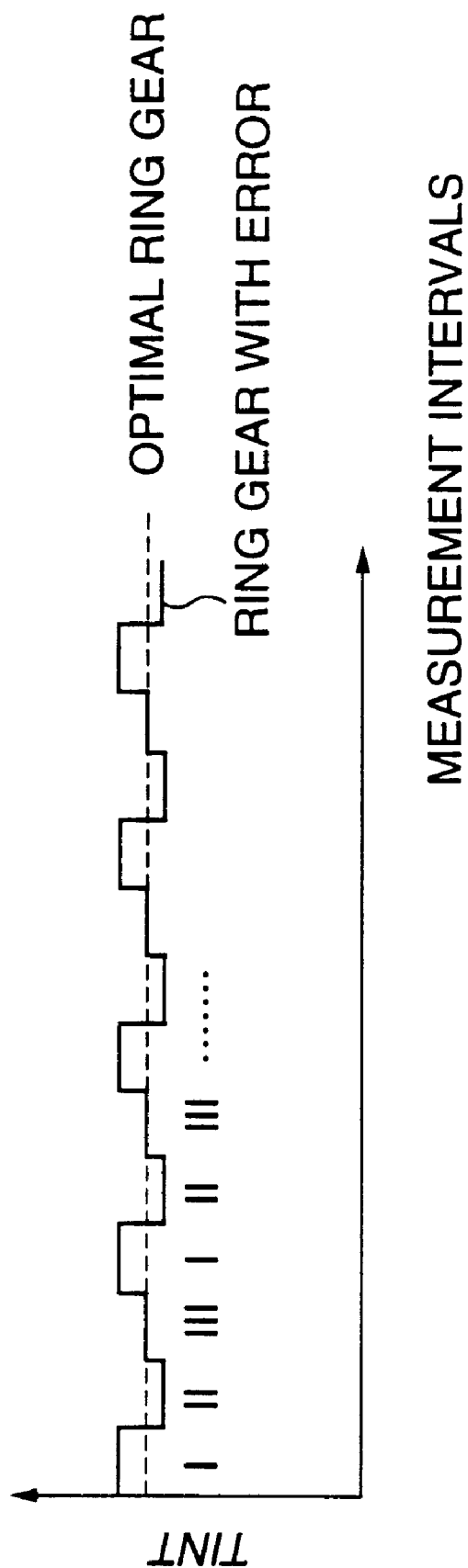
FIG. 5 is a diagram describing an error in the measurement of the passage time of a tooth of a ring gear.

However, there is some scatter in machining precision when the ring gear 4 is manufactured, and if the ring gear 4 has eccentricity or suffers wear due to long periods of use, scatter will appear in the value of TINT measured in the intervals I, II, III as shown in FIG. 5 even when the crankshaft rotates at constant speed. The misfire determining interval TINT is the time required to count a predetermined number of Pos signals of which the number input corresponds to the passage of the teeth of the ring gear 4. This means that when for example the density of teeth measured in, for example, Interval I is less dense than the specified value and the rows of teeth in Interval II are denser than the specified value, TINT will be greater than the specified value in the Interval I or less than the specified value in Interval II even if the same number of Pos signals are counted in Interval I and Interval II.

Figure 6A:
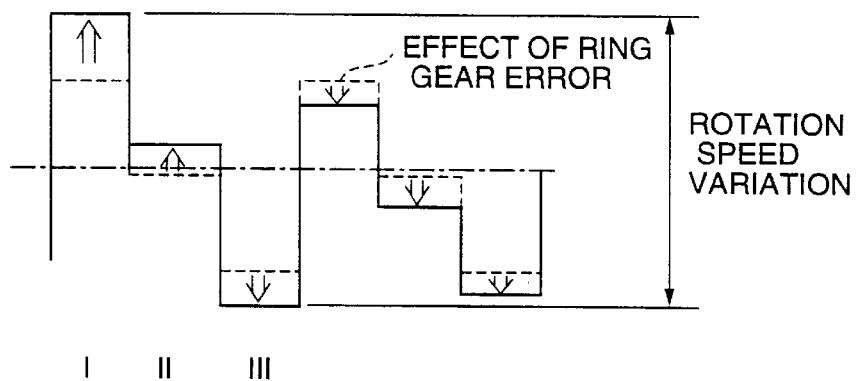
FIGS. 6A and 6B are diagrams which compare an apparent engine rotation speed fluctuation and a real engine rotation speed fluctuation.
Figure 6B:
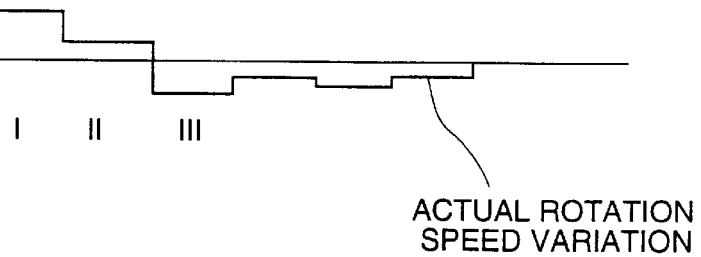

When rotation speed fluctuations other than those due to misfire shown in FIG. 6B are added to errors in the ring gear 4, apparent rotation speed fluctuations become larger than the fluctuations due to misfire as shown in FIG. 6A, and there is a risk that misfire will be incorrectly determined.

It is therefore necessary to correct the errors inherent in the ring gear 4. The basic concept of this correction is known from Tokkai Hei 4-101071 published by the Japanese Patent Office in 1992.

Figure 7:
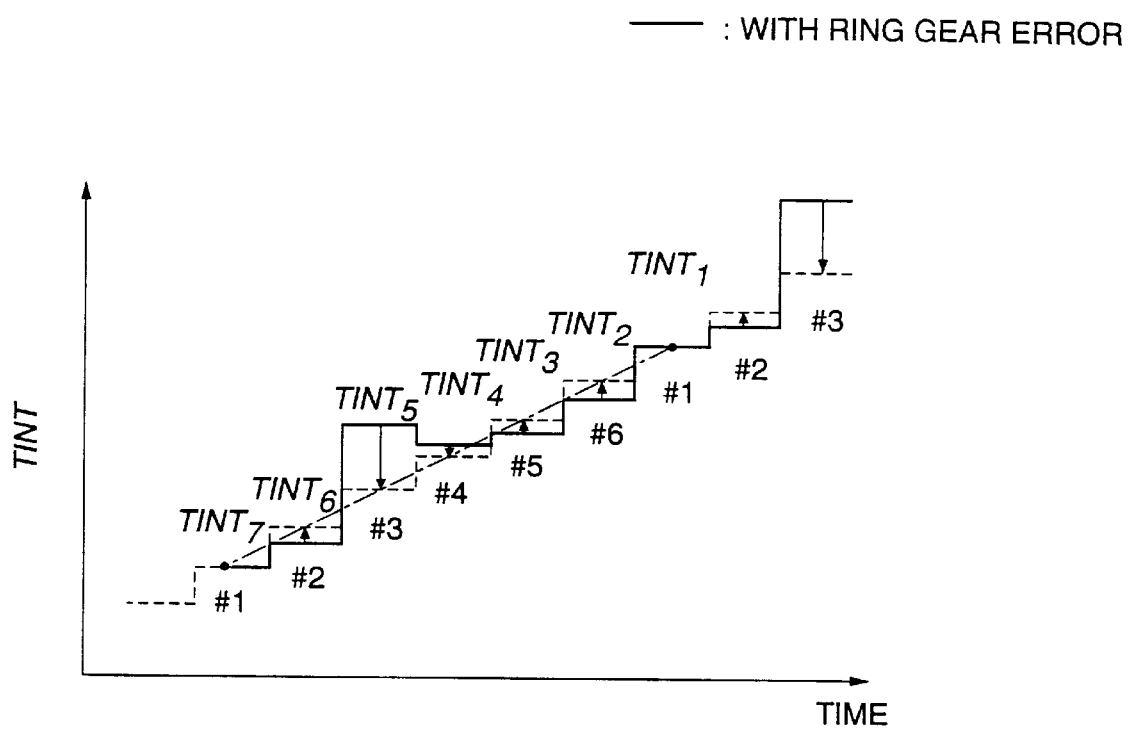
FIG. 7 is a timing chart describing a TINT correction by the misfire diagnosis apparatus.

This correction will be described with reference to FIG. 7. In this figure, the TINT which is actually measured is shown by a solid line. The basic concept of the correction is that the measured values for each cylinder are corrected to values shown by the dotted lines in the figure such that they all lie on a straight line having a predetermined slope, taking TINT for cylinder #1 as a reference.

For example taking cylinder #3 as an example, the required value of TINT for this cylinder is calculated by adding the result of multiplying the difference between the immediately preceding value of TINT for cylinder #1 and its present value by 4/6, to the immediately preceding value. The ratio of this required value of TINT and the measured value $TINT_5$ for cylinder #3 is taken as a TINT correction coefficient for cylinder #3. This relationship is expressed by the following equations (1) and (2).

$$\text{Required value of } TINT \text{ for cylinder \#3} = (TINT_7 - TINT_1) \cdot \frac{4}{6} + TINT_1 \quad (1)$$

-continued $$\text{TINT correction coefficient for cylinder \#3} = \tag{2}$$
$$\text{required value of TINT for cylinder \#3} / TINT_5 =$$
$$\frac{(TINT_7 - TINT_1) \cdot \frac{4}{6} + TINT_1}{TINT_5}$$

The control unit 7 also determines a TINT correction coefficient learnt value for each cylinder from the TINT correction coefficient found by the above equations, and corrects the error inherent in the ring gear by multiplying this learnt value by the measured value of TINT In general, the precision in the number of teeth of the ring gear has a scatter of effectively 1.0% in terms of TINT, but the scatter in the learnt value is suppressed to about 0.1% by this learning of the TINT correction coefficient.

Figure 8:
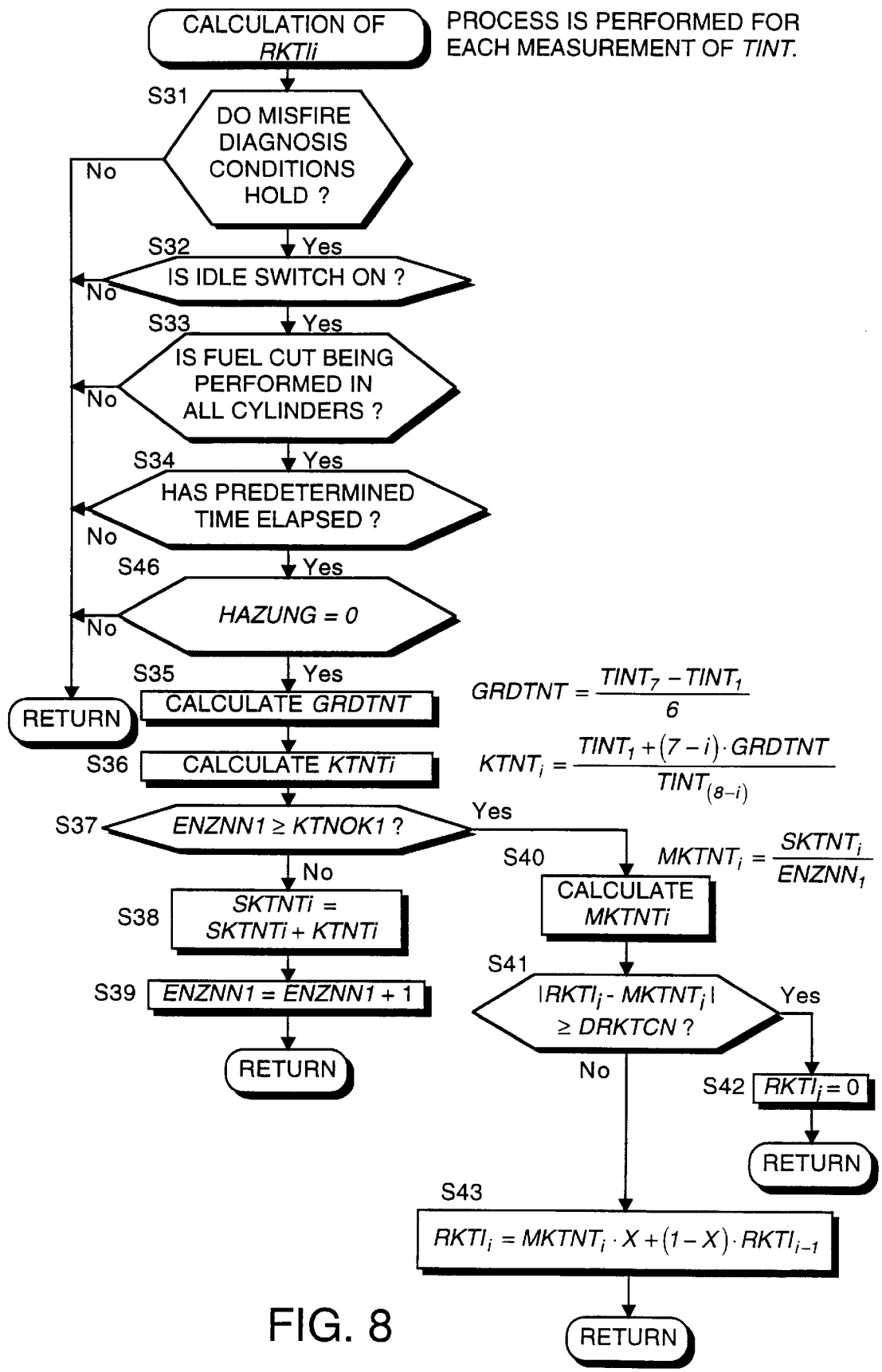
FIG. 8 is a flowchart describing a process of computing a TINT correction coefficient learnt value performed by the misfire diagnosis apparatus.

The flowchart of FIG. 8 shows a process for computing the TINT correction coefficient learnt value. This process is performed for each measurement of the misfire determining interval TINT.

In the steps S31, 32, 34, it is determined whether or not the following learning conditions are satisfied.

Step S31: Misfire diagnosis permission conditions have been established.

Step S32: The idle switch is ON.

Step S33: Fuel cut is being performed in all cylinders.

Step S34: A predetermined time has elapsed since the conditions in the steps S32 and S33 were satisfied.

When all the above conditions are satisfied, the routine proceeds to a step S35. When any of the conditions is not satisfied, the process is immediately terminated.

The above misfire diagnosis permission conditions are for example that there is no errors in the sensors, and that the engine is running under predetermined conditions.

In the step S35, a TINT slope coefficient GRDTNT is calculated by the following equation (3):

$$GRDTNT = \frac{TINT_7 - TINT_1}{6} \tag{3}$$

Next, this GRDTNT is used in a step S36 to calculate a correction coefficient $KTNT_i$ for each cylinder (where i is the cylinder number) by the following equation (4):

$$KTNT_i = \frac{TINT_1 + (7 - i) \cdot GRDTNT}{TINT_{(8-i)}} \tag{4}$$

Taking the cylinder #3 as an example, this becomes:

$$KTNT_3 = \frac{TINT_1 + 4 \cdot GRDTNT}{TINT_5}$$
$$= \frac{TINT_1 + 4 \cdot \frac{TINT_7 - TINT_1}{6}}{TINT_5}$$

which coincides with equation (2).

In a step S37, an integral $ENZNN_1$ of $KTNT_i$ and a determining value $KTNOK_1$ permitting calculation of an average value $MKTNT_i$ of $KTNT_i$ are compared. The initial value of $ENZNN_1$ is 0. When the processing of the step S37 is performed for the first time, $ENZNN_1 < KTNOK_1$, so the routine proceeds to steps S38, S39. In the step S38, an integral value $SKTNT_i$ of $KTNT_i$ is calculated by the following equation (5). The initial value of $SKTNT_i$ is 0.

$$SKTNT_i = SKTNT_i + KTNT_i \tag{5}$$

In the step S39, $ENZNN_1$ is incremented by 1.

By performing the steps S38, 39 each time TINT is calculated, $ENZNN_1$ gradually becomes equal to $KTNOK_1$. In this case, the processing of a step S40 and subsequent steps is performed.

In the step S40, the average value $MKTNT_i$ of $KTNT_i$ is calculated by the following equation (6):

$$MKTNT_i = \frac{SKTNT_i}{ENZNN_1} \tag{6}$$

The absolute value of a difference between this $MKTNT_i$ and a learnt value $RKTI_i$ described hereafter is compared with a determining value DRKTCN in a step S41. When the absolute value is less than DRKTCN, a cylinder-specific TINT correction learnt value $RKTI_i$ is updated by the following equation (7) in a step S43.

$$RKTI_i = MKTNT_i \cdot X + (1-X) \cdot RKTI_{i-1} \tag{7}$$

where, X=updating proportion $RKTI_{i-1}$=value of $RKTI_i$ on immediately preceding occasion Hence, an updated learnt value $RKTI_i$ is stored in the backup RAM, and when the misfire parameter MISA is computed, values obtained by multiplying $TINT_1$, $TINT_6$, $TINT_7$ by a learnt value corresponding to the value stored in the backup RAM is used. In this way, an incorrect diagnosis due to the precision of the ring gear is avoided.

On the other hand when $|RKTI_i - MKTNT_i| \geq DRKTCN$, the learnt value $RKTI_i$ is cleared in a step S42 and the learning process is repeated.

Next, the computation of the misfire parameters MISA, MISB will be described.

Figure 10:
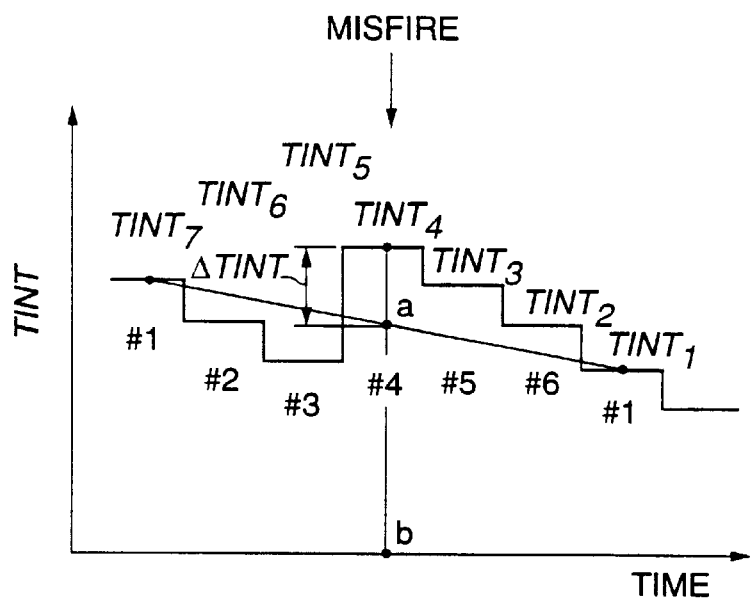
FIG. 10 is a diagram describing a calculation of a misfire parameter MISB performed by the misfire diagnosis apparatus.

First, FIG. 10 shows the misfire determining interval TINT when misfire occurs in cylinder #4 during acceleration in a six cylinder engine. Due to the misfire, TINT increases in cylinder #4, and TINT fluctuates widely in the vicinity of cylinder #4.

In this case, the misfire determining interval TINT is measured using the same gear tooth position for cylinders #1 and #4. In the following description, the cylinders in which TINT is measured using the same tooth, will be referred to as corresponding cylinders. Herein, TINT for cylinder #1 detected using the same tooth one engine rotation earlier and TINT detected using the same tooth one engine rotation later are joined by a straight line centered on the misfired cylinder #4. The portion protruding above the straight line is thereby estimated as a time increase ΔTINT of TINT for cylinder #4 due to misfire. This time increase ΔTINT is calculated by drawing the length of an interval a–b in the figure from $TINT_4$ using the following equation (8):

$$\Delta TINT = \frac{3 \cdot (TINT_4 - TINT_7) + 3 \cdot (TINT_4 - TINT_1)}{6} \tag{8}$$

Herein, the time increase ΔTINT due to misfire, the torque generated by the engine and the engine rotation speed have the following relation:

$$\Delta TINT \propto \frac{\text{GENERATED TORQUE}}{(\text{ENGINE ROTATION SPEED})^3} \quad (9)$$

Further, as an inverse relation exists between the engine rotation speed and the misfire determining interval TINT, this relation may be updated by the following relation:

$$\text{GENERATED TORQUE} \propto \Delta TINT \cdot \quad (10)$$

$$(\text{ENGINE ROTATION SPEED})^3$$

$$= \frac{\Delta TINT}{TINT^3}$$

Regarding the misfire determining interval TINT measured for the same ring gear tooth position as for cylinders #1 and #4, the misfire parameter MISB may be defined by the following equation (11):

$$MISB = \frac{6 \cdot \Delta TINT}{TINT_7{}^3} \quad (11)$$

Comparing equations (10) and (11), it is seen that the misfire parameter MISB is a value which physically corresponds to the torque, because the time increase $\Delta TINT$ due to misfire depends on the engine rotation speed, and it becomes less the higher the rotation speed. By defining a value obtained by dividing this time increase $\Delta TINT$ by the cube of a predetermined time measurement value as a misfire parameter MSTB, MSTB is prevented from being affected by the engine. Also, 6 in equation (11) is a constant to prevent the value of MISB from becoming too small.

Substituting $\Delta TINT$ in equation (8) into equation (11), the misfire parameter MISB is ultimately given by the following equation (12):

$$MISB = \frac{3 \cdot (TINT_4 - TINT_7) + 3 \cdot (TINT_4 - TINT_1)}{TINT_7{}^3} \quad (12)$$

In equation (12), the first term of the numerator on the right-hand side is a difference in TINT between the misfire cylinder and the corresponding cylinder one engine rotation earlier, and the second term of the numerator on the right-hand side is a difference in TINT between the misfire cylinder and the corresponding cylinder one engine rotation later.

As shown in FIG. 10, when a misfire occurs in the 4th cylinder and $TINT_4$ increases, MISB increases. Consequently, when MISB is equal to or greater than a determined value, it is determined that a misfire has occurred. When this misfire is determined using MISB, the same ring gear tooth position is used, hence the determination is not affected by inconsistencies in the shape of the ring gear.

However when for example a misfire occurs in both cylinders #1 and #4, $TINT_1$, $TINT_4$ and $TINT_7$ all increase in the same way. Hence $\Delta TINT \approx 0$. i.e. MISB$\approx 0$, and a misfire determination can no longer be performed.

Figure 11:
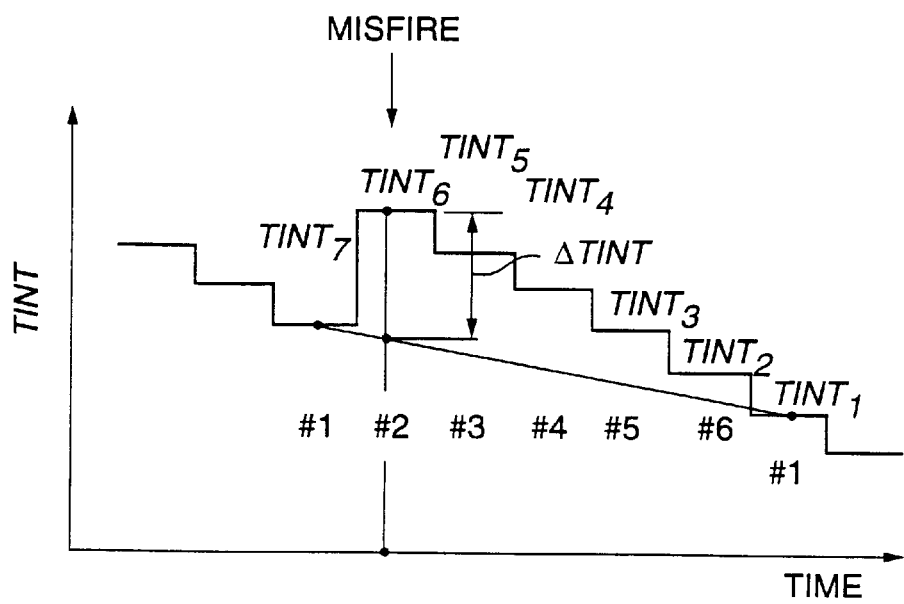
FIG. 11 is a diagram describing a calculation of a misfire parameter MISA performed by the misfire diagnosis apparatus.

Therefore as shown in FIG. 11, when a misfire occurs for example in cylinder #2, the time increase $\Delta TINT$ due to a misfire is calculated by equation (13) using the measured value for cylinder #1, which is the cylinder fired in the ignition immediately preceding the misfire.

$$\Delta TINT = \frac{5 \cdot (TINT_6 - TINT_7) + (TINT_6 - TINT_1)}{6} \quad (13)$$

The other misfire parameter MISA is defined by the following equation (14):

$$MISA = \frac{6 \cdot \Delta TINT}{TINT_7{}^3} \quad (14)$$

The misfire parameter MISA is ultimately given by the following equation (15):

$$MISA = \frac{5 \cdot (TINT_6 - TINT_7) + (TINT_6 - TINT_1)}{TINT_7{}^3} \quad (15)$$

In equation (15), the first term of the numerator on the right-hand side is a TINT difference between the misfired cylinder and the cylinder fired on the immediately preceding ignition, and the second term of the numerator on the right-hand side is a TINT difference between the misfired cylinder and the current cylinder. In a six cylinder engine, the TINT difference between the misfired cylinder and the cylinder fired on the immediately preceding ignition affects the misfire parameter 5 times more than the TINT difference between the misfired cylinder and the current cylinder.

Hence using the misfire parameter MISA obtained as described hereabove, even when misfire occurs consecutively in the corresponding cylinder measured at the same ring gear position as in the case of the aforesaid cylinders #1 and #4, misfire may be determined when MISA is equal to or greater than a determined value.

Figure 9:
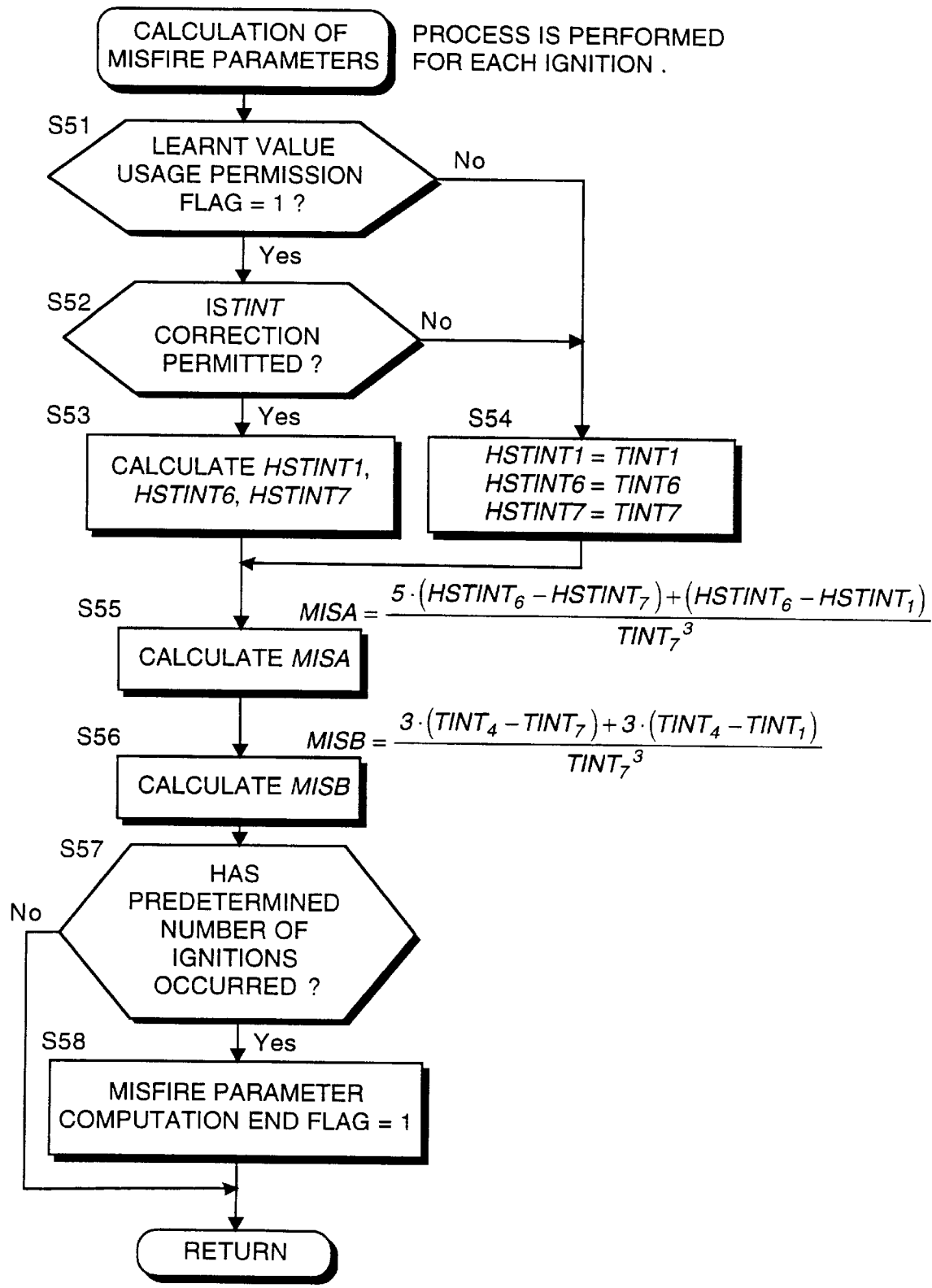
FIG. 9 is a flowchart describing a process of computing a misfire parameter performed by the misfire diagnosis apparatus.

FIG. 9 shows a process for computing the misfire parameters MISA and MISB. This process is executed each time the fuel-air mixture is ignited by a spark plug.

A step S51 will be described hereafter. In a step S52, it is determined whether or not TINT correction is permitted. For TINT correction to be performed, the following two conditions must be satisfied.

(1) The learnt value $RKTI_i$ lies within a predetermined range for all cylinders.

(2) Computation of the aforesaid average value $MKTNT_i$ has been performed at least once after engine startup.

When the TINT correction permission conditions are satisfied, the corrections TINT are calculated by the following three equations in a step S53:

$HSTINT_1 = TINT_1 \cdot RKTI_1$
$HSTINT_6 = TINT_6 \cdot RKTI_6$
$HSTINT_7 = TINT_7 \cdot RKTI_7$ When the TINT correction permission conditions are not satisfied, $TINT_1$, $TINT_6$, $TINT_7$ are set equal to $HSTINT_1$, $HSTINT_6$, $HSTINT_7$ in a step S54.

In a step S55, the misfire parameter MISA is calculated from the following equation (15'):

$$MISA = \frac{5 \cdot (HSTINT_6 - HSTINT_7) + (HSTINT_6 - HSTINT_1)}{TINT_7{}^3} \quad (15')$$

In a step S56, the misfire parameter MISB is calculated using the above equation (12). In a step S57, it is determined whether or not a predetermined number of ignitions has occurred since misfire determination was permitted.

When the predetermined number of ignitions has occurred, a misfire parameter computation end flag showing that computation of the misfire parameters has been completed is set to "1", and the process of FIG. 9 is terminated. The initial value of the misfire parameter computation end flag is "0".

Figure 12:
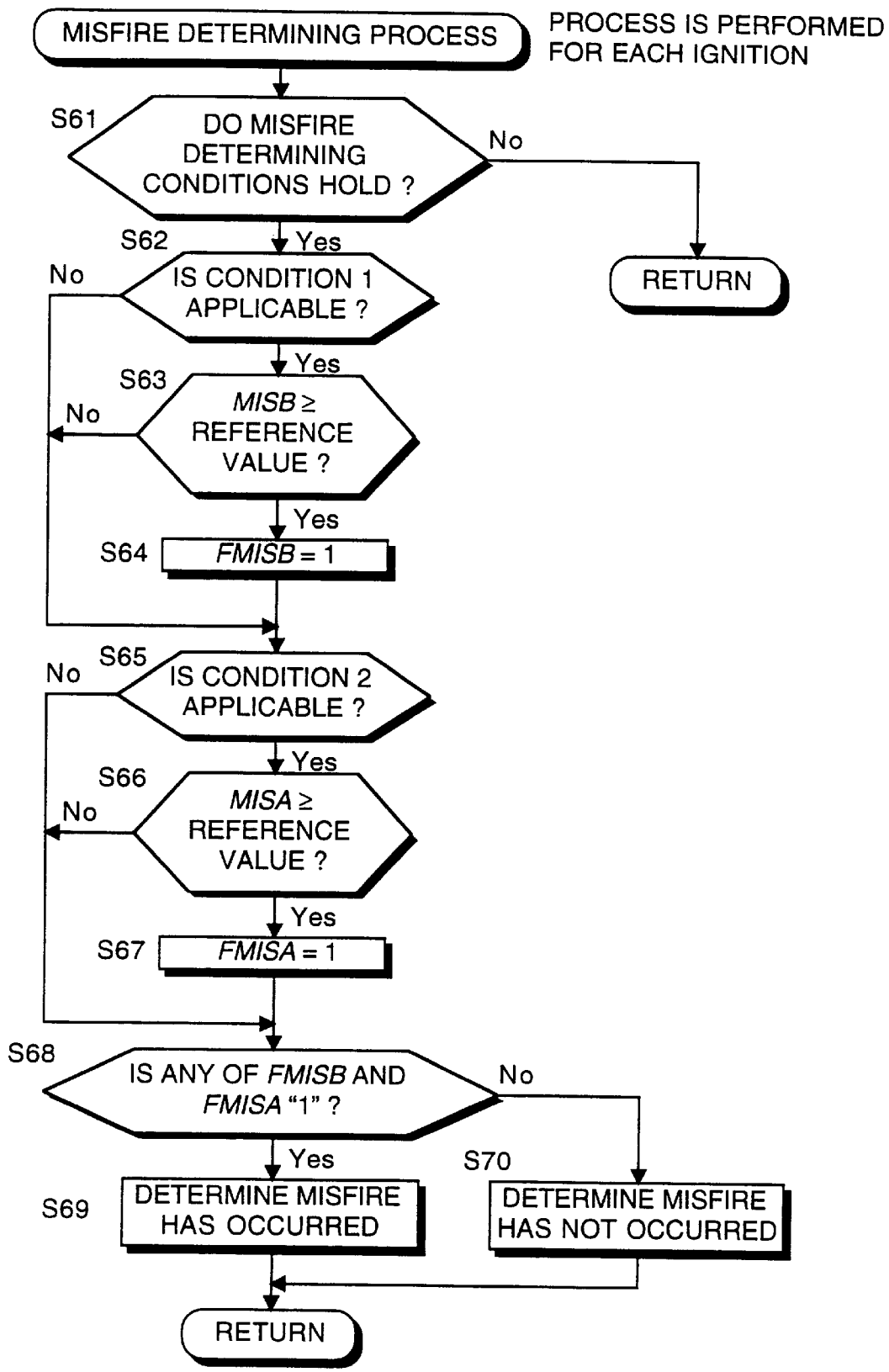
FIG. 12 is a flow chart describing a misfire determining process performed by the misfire diagnosis apparatus.

FIG. 12 shows the misfire determining process. This process is performed after calculation of the misfire parameters of FIG. 9.

First, in a step S61, it is determined whether or not the misfire determining permission conditions hold. These conditions are that the conditions for misfire diagnosis permission of the step S31 of FIG. 8 hold, and that a predetermined number of ignitions has occurred while they hold. Only when the misfire determining permission conditions are satisfied does the routine proceed to a step S62 and following processing, and when the misfire determining permission conditions are not satisfied, the routine is immediately terminated.

The step S62, and steps S63, S64, are steps for making a determination according to a misfire determining condition 1. Following steps S65, S66, S67 are steps for making a determination according to a misfire determining condition 2.

Figure 13:
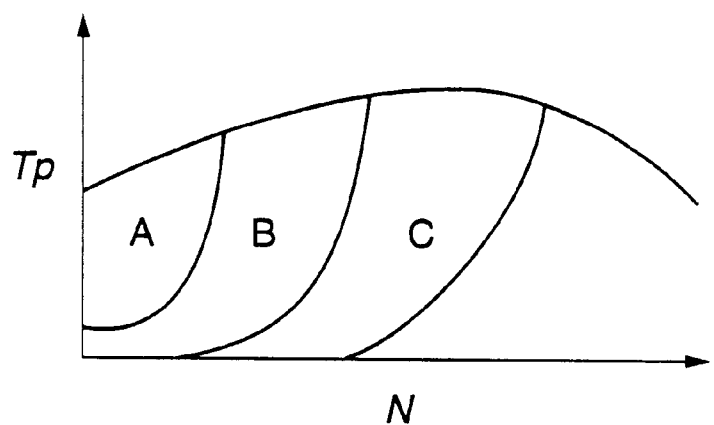
FIG. 13 is a diagram showing a running region of an engine to which the misfire diagnosis apparatus applies a misfire determining condition 1.
Figure 14:
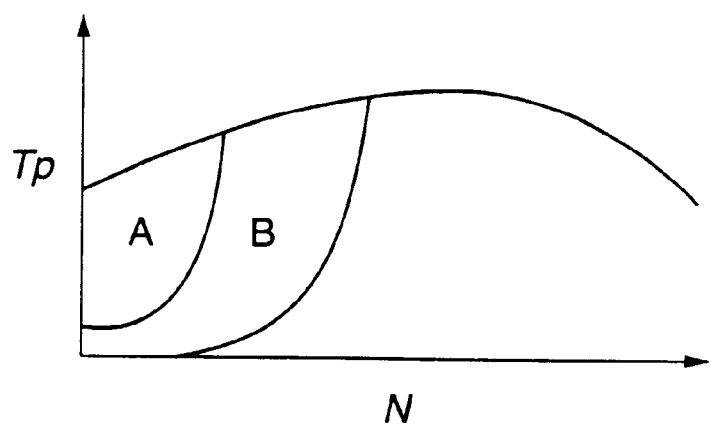
FIG. 14 is a diagram showing a running region of an engine to which the misfire diagnosis apparatus applies a misfire determining condition 2.

These two misfire determining conditions are set corresponding to the above two misfire parameters MISB and MISA. The misfire determining area is divided as shown in FIGS. 13 and 14 according to the precisions of the misfire parameters. The precisions of the misfire parameters are MISA<MISB.

In the step S62, it is determined that when the running conditions determined by the engine rotation speed N and basic injection pulse width Tp are in any of the regions shown by A, B, C of FIG. 13, the misfire determining condition 1 is applicable. In this case, it is determined in the step S63 whether or not the misfire parameter MISB is equal to or greater than a predetermined value. When MISB is equal to or greater than a predetermined value, the routine proceeds to the step S64 where a flag FMISB showing that a misfire has occurred is set to "1". The initial value of FMISB is "0".

In the steps S65, S66, S67, as in the case of the steps S62, S63, S64, when it is determined that the running conditions are within either of the regions shown by A and B in FIG. 14, it is determined that the misfire determining condition 2 is applicable. In this case, it is determined whether or not the misfire parameter MISA is equal to or greater than a predetermined value. When MISA is equal to or greater than the predetermined value, a flag FMISA showing that a misfire has occurred is set to "1". The initial value of FMISA is "0".

In a step S68, when at least one of the flags FMISB and FMISA is "1", it is determined in a step S69 that there has been a misfire. When neither are "1", it is determined in a step S70 that there has not been a misfire.

However, if the ring gear tooth position in the TINT measurement is different from that when on the immediately preceding occasion when the vehicle was running due to scatter in the appearance of the Ref signal in cylinder #1, and a TINT correction is applied using the learnt value $RKTI_i$ for the immediately preceding occasion when the vehicle was running, there is a risk of an incorrect diagnosis in the misfire determination using the misfire parameter MISA.

To deal with this situation, in this diagnostic apparatus, a check is made on engine startup as to whether or not it is appropriate to use the learnt value $RKTI_i$ which was backed up on the immediately preceding occasion when the vehicle was running, for determining a misfire on the present occasion. For this purpose, it is verified whether or not the position of the ring gear tooth in the TINT measurement is the same as on the immediately preceding occasion when the vehicle was running, and if it is not the same, a correction is applied so that TINT measurement is performed using the same tooth as on the immediately preceding occasion when the vehicle was running.

Figure 16A:
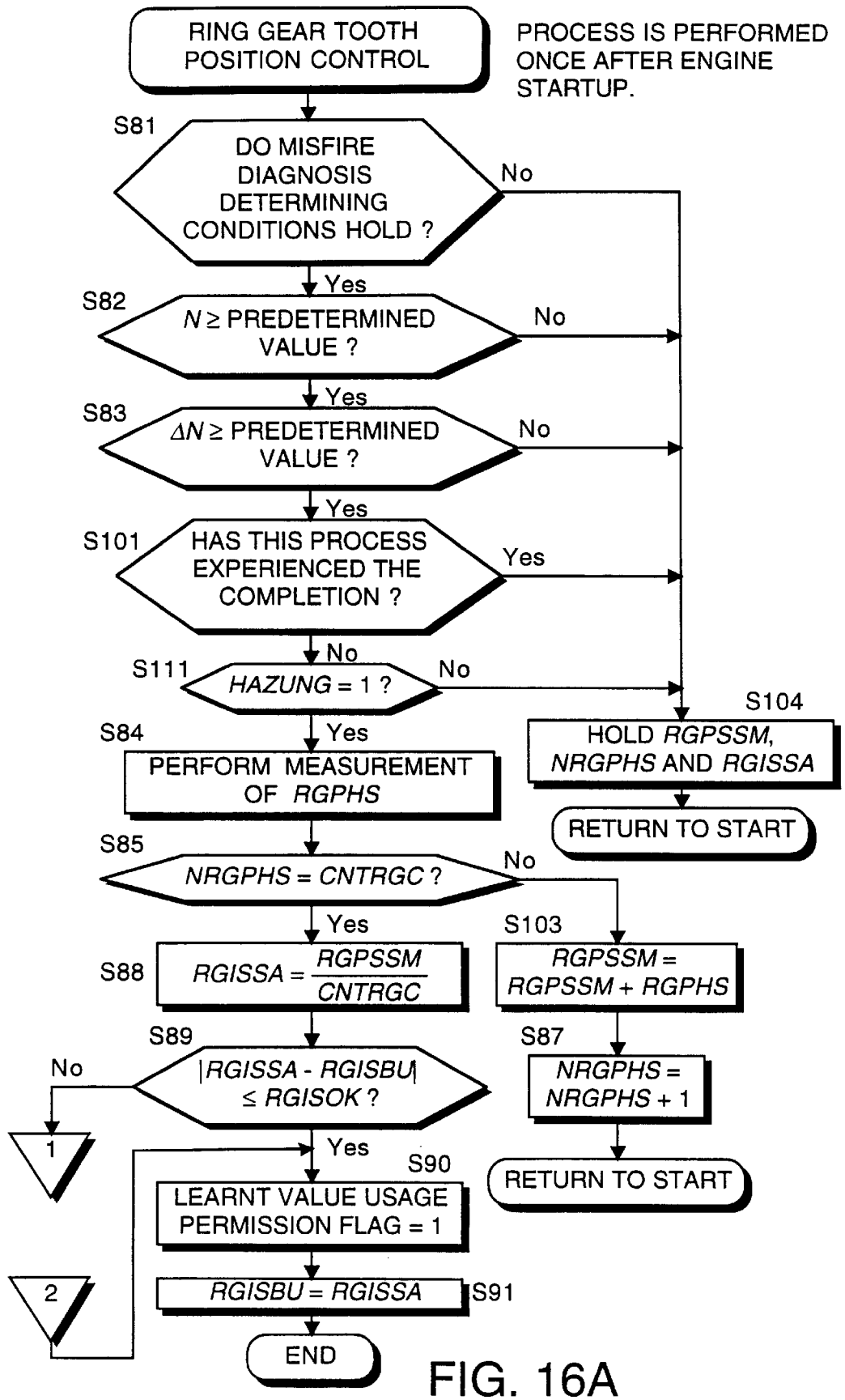
FIGS. 16A and 16B are flowcharts describing a process of checking and correcting a ring gear tooth position performed by the misfire diagnosis apparatus.
Figure 16B:
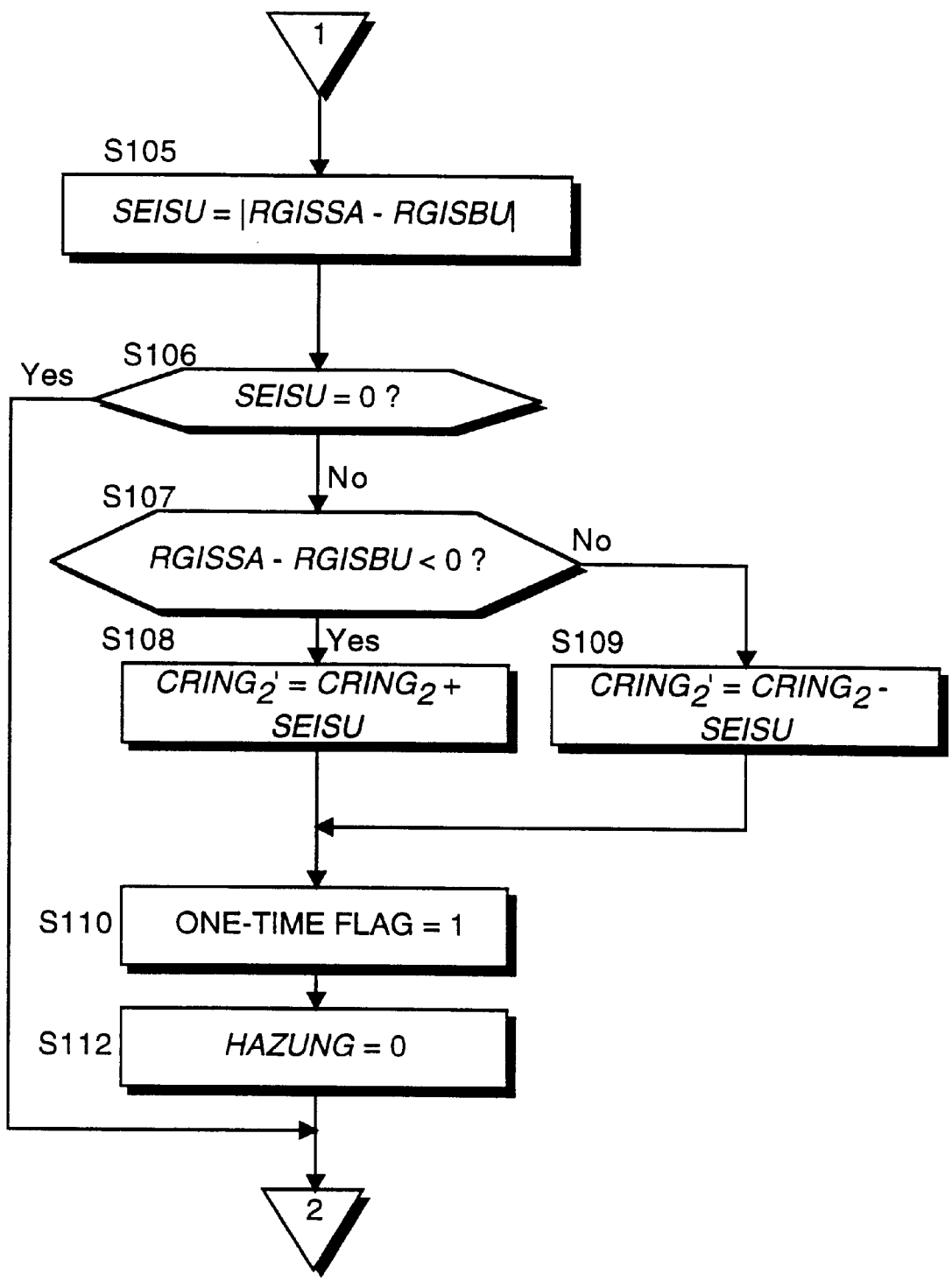

This process is shown in FIGS. 16A and 16B. The step S51 of FIG. 9 corresponds to this process. This process is performed once when the engine is started.

In steps S81, S82 and S83, it is determined whether or not the following conditions hold:

(1) The misfire diagnosis permission conditions hold (step S81)

(2) The engine rotation speed N is equal to or greater than a predetermined value (step S82)

(3) A rise ΔN of the engine rotation speed in a predetermined time interval is equal to or greater than a predetermined value (step S83)

When all these conditions hold the routine proceeds to a step S101 and subsequent steps, and when any of these conditions does not hold, the calculated values in preceding processes are held in a step S104 and the process returns to the start, then resumes from the step S81. This process is repeated until all the above conditions hold. The repeating interval of the process is identical to the interval of the Ref signal of each cylinder.

The above diagnosis permission conditions are the same as the diagnosis permission conditions of the step S31.

Figure 15:
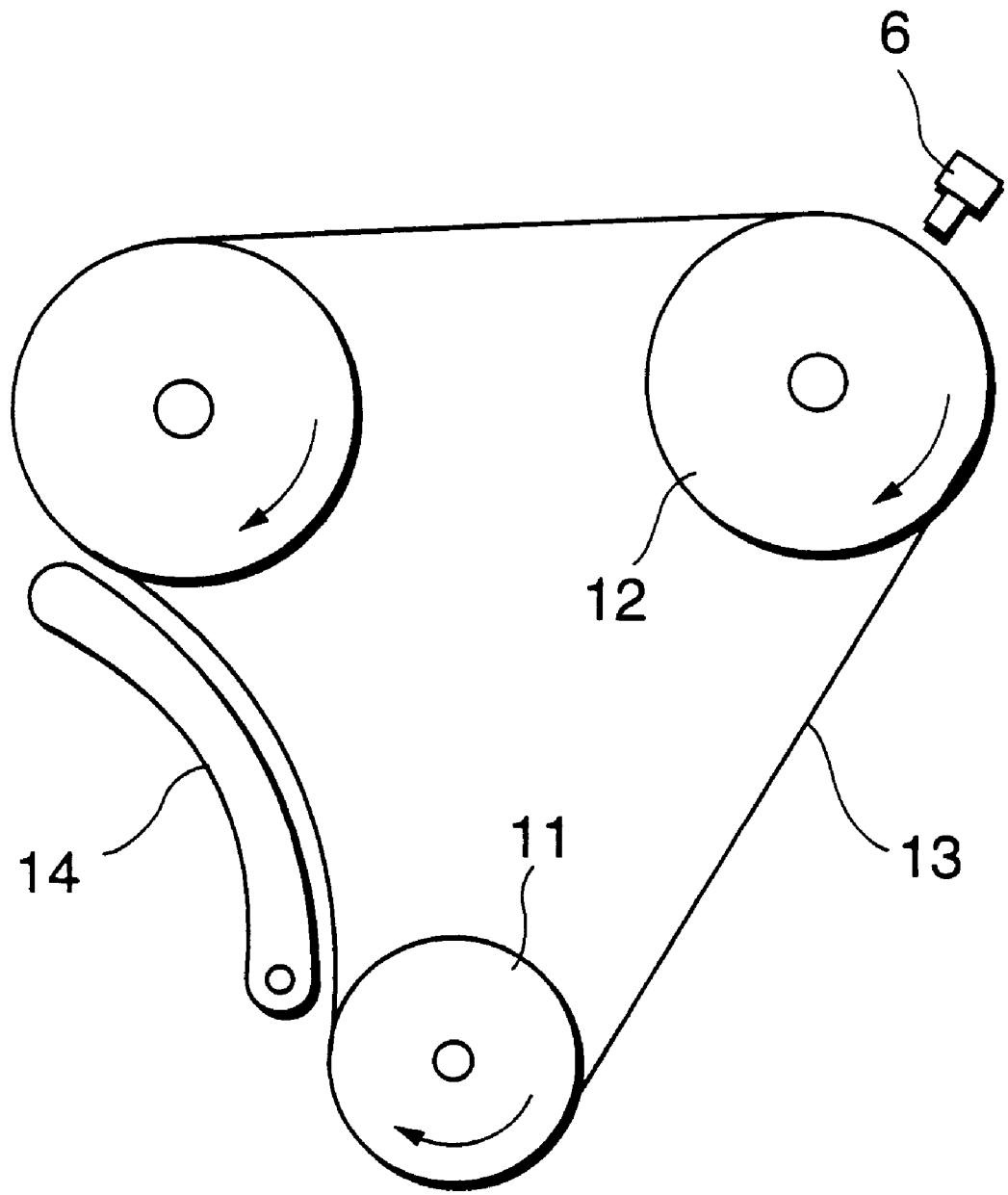
FIG. 15 is a lateral view of a timing chain and sprocket of the engine to which this invention is applied.

As shown in FIG. 15, conditions (2) and (3) correspond to the condition that a timing chain 13 which runs around a crank sprocket 11 and cam sprocket 12 has no slack. When the engine rotation speed N becomes equal to or greater than a predetermined value, the oil pressure supplied to a chain tensioner 14 by a oil pressure pump which drives the engine, has increased to a sufficiently high level. When the vehicle is accelerated in this state, the timing chain 13 becomes taut. Under these conditions, there is no shift in the appearance of the Ref signal in cylinder #1 obtained by the crank angle sensor 6.

The step S101 and a step S1 will be described hereafter.

Figures 3A, 3B:
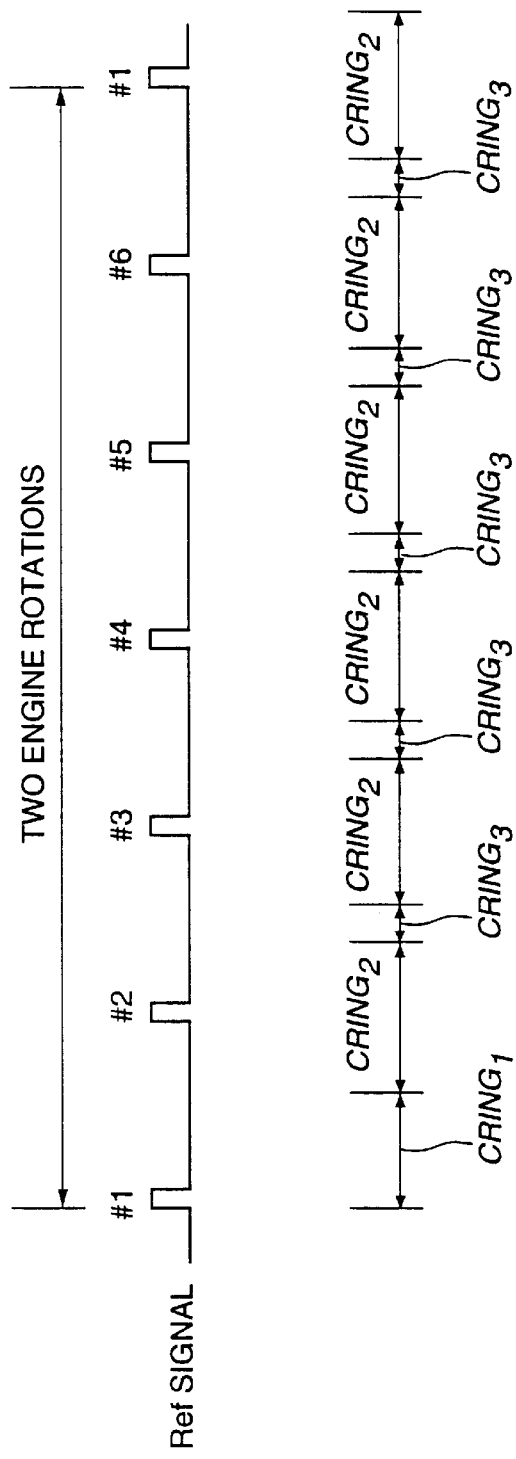
FIGS. 3A–3B are timing charts describing three constants $CRING_1$, $CRING_2$, $CRING_3$ used by the misfire diagnosis apparatus.

In a step S84, the number of Pos signals from the appearance of the Ref signal of the corresponding cylinder to the tooth immediately preceding the point at which measurement of the misfire determining interval TINT starts, is measured as a Pos signal phase monitor value RGPHS. The TINT measuring start point is found by counting Pos signals with a predetermined pattern from cylinder #1 as shown in FIG. 3B. More specifically, for cylinders other than #1, the Pos signal input immediately after $CRING_3$ has been measured is the TINT measuring start point.

In a step S85, an accumulated number of times NRGPHS that the measurement was performed is compared with a predetermined value CNTRGC. The accumulated number NRGPHS is cleared to 0 when the ignition switch is switched ON, therefore the process proceeds from the step S85 to steps S103 and S87 until NRGPHS has become equal to or greater than CNTRGC.

In the steps S103 and S87, the above Pos signal phase monitor value RGPHS is added to a cumulative value RGPSSM, and the accumulated number NRGPHS is incremented by 1. The integral value NRGPHS is also cleared to 0 when the ignition switch is switched ON.

When the accumulated number NRGPHS has become equal to or greater than CNTRGC by repeating the processing of the step S87, the routine proceeds from the step S85 to a step S88 and subsequent steps. When NRGPHS does not reach the CNTRGC, the process returns to the start and resumes from the step S81. In the step S88, an average value RGISSA of RGPHS$_1$ is computed by dividing the integral value NRGPHS by CNTRGC. In a step S89, |RGISSA−RGISBU| is compared with a determining value RGISOK. RGISBU is a value backed up in a backup RAM of the control unit 7 which is equivalent to RGISSA on the immediately preceding occasion when the vehicle was running. RGISOK is a positive value. According to the result of the comparison either of the following processes (1) or (2) is performed.

(1) When |RGISSA−RGISBU|≦RGISOK it is determined that the ring gear tooth position in the TINT measurement is the same as that when TINT was measured on the immediately preceding occasion when the vehicle was running. In this case, a usage permission flag of a learnt value is set to "1" in steps S90 and S91. This flag is initialized to "0" when the ignition switch is switched ON. Also RGISSA is transferred to RGISBU in order to control checking of the tooth position on the next occasion when the vehicle is running, and this is stored in a backup RAM of the control unit 7. After this processing is completed, the tooth position check control process is not performed until the ignition switch is switched OFF and is switched ON again.

(2) When conditions are not as in (1) above, i.e. when |RGISSA−RGISBU|>RGISOK, the routine proceeds to a step S105. Herein, a shift SEISU of the ring gear tooth position in the TINT measurement from the immediately preceding occasion when the vehicle was running, is calculated by the following equation (16):

$$SEISU=|RGISSA-RGISBU| \quad (16)$$

where, SEISU is an integer 1, 2, 3, . . . etc.

In a step S106, it is verified that SEISU is not 0, and the routine proceeds to a step S107 where the difference between the average value RGISSA and the backup value RGISBU is compared with 0.

When the average value RGISSA is less than the backup value RGISBU, in a step S108, a correction value CRING$_2$' of the second predetermined number CRING$_2$ is calculated by equation (17):

$$CRING_2'=CRING_2+SEISU \quad (17)$$

When RGISSA is equal to or greater than RGISBU, in a step S109, the correction value CRING$_2$' of the second predetermined number CRING$_2$ is calculated by equation (18):

$$CRING_2'=CRING_2-.SEISU \quad (18)$$

In a step S110, the one-time flag is set to "1". This flag is a flag which, when it is determined that the ring gear tooth position in the TINT measurement is not the same as on the immediately preceding occasion when the vehicle was running, is required to perform one forced shift of the TINT measuring interval so as to make the TINT measuring interval the same as that on the immediately preceding occasion when the vehicle was running.

In the step S21 of the aforesaid FIG. 4, the one-time flag is determined. When the one-time flag is set to "1", the correction value CRING$_2$' is applied to the second predetermined number instead of CRING$_2$ in a step S22.

In a step S23 to which the routine proceeds on the first occasion when the third tooth counter coincides with CRING$_3$ in FIG. 4, the one-time flag is reset to "0".

The aforesaid control will now be described with reference to FIGS. 17A–17D. For the sake of simplicity, it will be assumed that CNTRGC=1, i.e. that the average value RGISSA=RGPHS.

FIG. 17B corresponds to the case when there was no input of noise on the immediately preceding occasion when the vehicle was running. Numbers are assigned to Pos signals as shown in the figure, the third predetermined number CRING$_3$ is set to 4 and the second predetermined number CRING$_2$ is set to 40. In this case, the 2nd to 5th Pos signals correspond to CRING$_3$, and the 6th to 45th Pos signals correspond to CRING$_2$.

The Pos signal phase monitor value, i.e. the number RGPHS of Pos signals from the appearance of the Ref signal in each cylinder to the tooth immediately preceding the point at which TINT measurement starts, is 4. 4 is therefore stored as the backup value RGISBU.

It will also be assumed that on the present occasion when the vehicle is running, a noise is input after the 2nd Pos signal as shown in FIG. 17C. As this noise is incorrectly counted as a Pos signal, after noise input, the TINT measurement interval is shifted one tooth earlier than in the case of FIG. 17B. In this case, as RGPHS after the appearance of the Ref signal in cylinder #2 is 3, the average value RGISSA (=RGPHS) is 3. Herein, if the determining value RGISOK is set for example equal to 0.2, |RGISSA−RGISBU|=1 is greater than the determining value RGISOK.

The tooth position check control process therefore proceeds from the step S89 to the step S105 of FIG. 16B, and SEISU=1 is calculated. As a result, this process proceeds via the steps S106 and S107 to the step S108.

In the step S108, CRING$_2$'=40+1, and in the step S110, the one-time flag is set to "1". By setting this one-time flag to "1", the immediately following second tooth counter counts Pos signals up to CRING$_2$' which is greater than CRING$_2$ by 1. Hence the interval from the 104th to the 144th Pos signal is the TINT measurement interval as shown in FIG. 17D.

As a result, after the Ref signal has appeared in cylinder #4, RGPHS (=RGISSA) is again 4, so the ring gear tooth position in the TINT measurement is the same as that on the immediately preceding occasion when the vehicle was running. In the subsequent processes, RGISSA=RGISBU, so the routine proceeds from the step S89 to the step S90 of FIG. 16A. Herein, the usage permission flag of a learnt value is set to "1". By setting this usage permission flag of a learnt value to "1", the learnt value for the immediately preceding occasion when the vehicle was running can be used for the correction of TINT on the present occasion without modification.

As this correction is applied so that the ring gear tooth position in the TINT measurement is the same as that on the immediately preceding occasion when the vehicle was running, there is no need to discard the learnt value for the immediately preceding occasion and repeat the learning. Even when noise is incorrectly counted as a Pos signal, this correction is applied so that the ring gear tooth position in the TINT measurement is the same as that on the immediately preceding occasion when the vehicle was running, so the corrected TINT may be found with high precision using the learnt value for the immediately preceding occasion without modification.

FIGS. 17A–17D show the case where the average value RGISSA is less than the backup value RGISBU due to noise input, but the situation is the same when the average value RGISSA is greater than the backup value RGISBU. For example, when the magnetic pickup 5 fails to detect a tooth for some reason, RGISSA becomes greater than RGISBU, and the ring gear position in the TINT measurement is shifted back. In this case, the ring gear position in the TINT measurement is made the same as on the immediately preceding occasion when the vehicle was running by setting $CRING_2'$ to a value which is less than $CRING_2$ by an amount corresponding to the shift.

However, when the Pos signal phase monitor value is measured for only one cylinder and a check is performed as to whether or not the ring gear position in the TINT measurement has shifted from the immediately preceding occasion when the vehicle was running based on an average value of several measurements for the same cylinder, a considerable time is required to check the shift of the ring gear position in the TINT measurement. Since a TINT correction cannot be applied during this time, the precision of the misfire determination decreases. Moreover if it is attempted to enhance response by decreasing the sampling frequency of the Pos signal phase monitor value, the reliability of checking the shift of the ring gear position in the TINT measurement decreases.

In particular, in an engine wherein the appearance of the Ref signal in cylinder #1 and the input timing of a Pos signal are close to each other, the timing of the Ref signal in cylinder #1 easily shifts beyond the Pos signal due to vibration of the crankshaft or cam shaft so that the Pos signal phase monitor value fluctuates by one tooth. In this situation, it is impossible to increase the precision of checking the shift of the ring gear position in TINT measurement.

According to this invention therefore, the Pos signal phase monitor value is measured for a plurality of cylinders, and it is determined whether or not there is a shift in the ring gear position in the TINT measurement by comparing the sum of the Pos signal phase monitor values for this plurality of cylinders and the sum value in the immediately preceding cycle.

Figure 18:
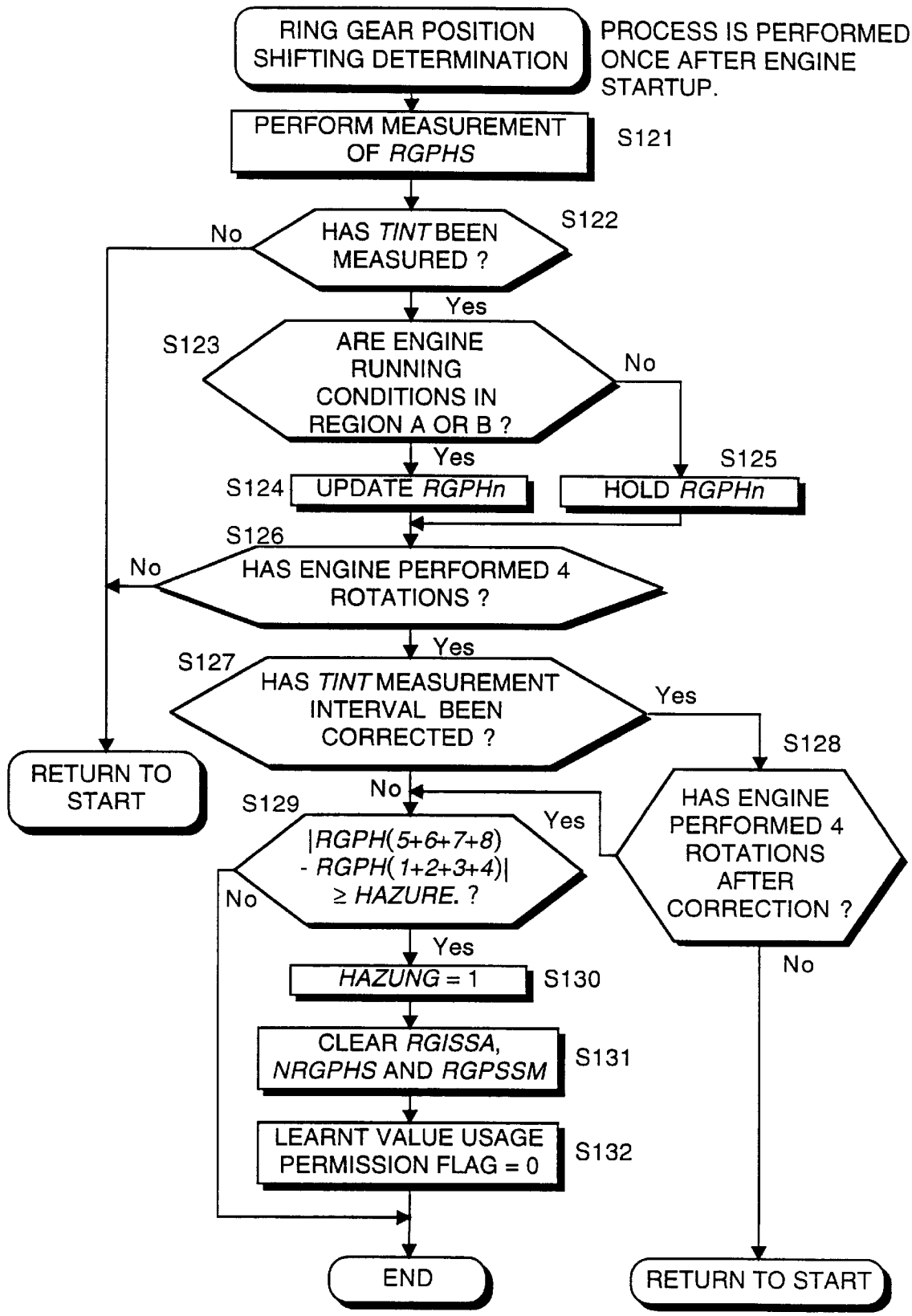
FIG. 18 is a flowchart describing a process of detecting a shift in the position of the ring gear performed by the diagnosis apparatus.

This determining process is shown in the flowchart of FIG. 18. Further provided in relation to this process are the step S101, S111 and a step S112 in the flowcharts of FIGS. 16A, 16B, and a step S46 in the flowchart of FIG. 8.

FIG. 18 shows the process for determining whether or not the ring gear position in the TINT measurement is shifted. This process is performed once when the engine is started.

Figure 1B:
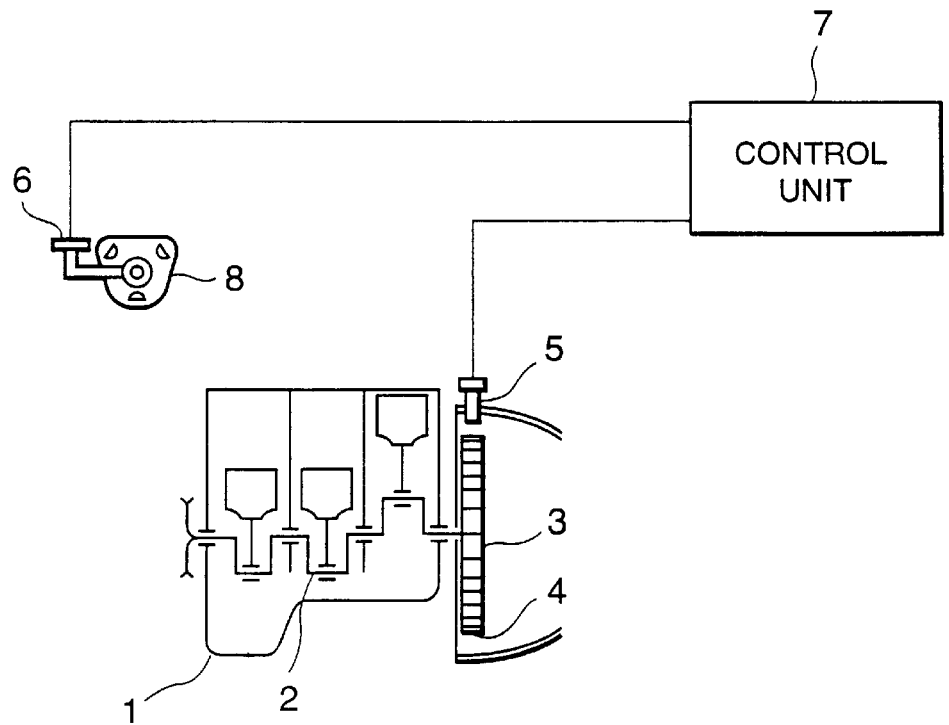

Until now, this invention has been described in the context of its application to a six cylinder engine, but insofar as concerns the present part, the description will apply to a four cylinder engine as shown in FIG. 1B. In this case, there are four cylinders #1 to #4 in order of firing sequence.

First, in the step S121, the Pos signal phase monitor value RGPHS is measured. This RGPHS is the number of Pos signals from when the Ref signal appears in each cylinder to the Pos signal input immediately before the tooth at which TINT measurement starts.

In steps S122, S123, S126, it is determined whether or not the following conditions hold for performing a check on the shift of the ring gear tooth position in the TINT measurement, (1) TINT has been measured (step S122)
(2) The engine running conditions are in the region A or B shown in FIGS. 13 and 14 (step S123)
(3) The engine has performed at least four rotations since starting TINT measurement (step S126)

When all of the above conditions are satisfied, the routine proceeds to a step S129 via a step S127 or a step S128. The steps S127 and S128 will be described hereafter.

Herein, condition (3) is based on the principle that at least four engine rotations are necessary to obtain two cycles of past data for RGPHS, as described below. Condition (2) implies that the TINT correction coefficient learnt value is used only for the misfire parameter MISA, and as the misfire determination using the misfire parameter MISA is performed in either region A or region B, the region in which a check is made on the shift of the ring gear position in the TINT measurement should be limited to region A or region B.

When the condition (2) is satisfied, a Pos signal phase monitor value $RGPH_n$ (n=1–8) is updated in a step S124. Herein, $RGPH_1$ is a memory for storing the latest value of RGPHS, $RGPH_2$ is a memory for storing the value of RGPHS measured on the immediately preceding occasion, and $RGPH_8$ is memory for storing the value of RGPHS measured on the 7th preceding occasion. In the case of a six cylinder engine, memories $RGPH_1$–$RGPH_{12}$ are provided.

In the step S123, when the engine running conditions lie outside both region A and region B, the routine proceeds to a step S125 and $RGPH_n$ is retained without change.

In the step S129, it is determined whether or not the tooth position of the ring gear 4 in the TINT measurement is shifted by comparing the absolute value of the difference of RGPH(5+6+7+8) and RGPH(1+2+3+4) with a determination value HAZURE.

Figure 19:
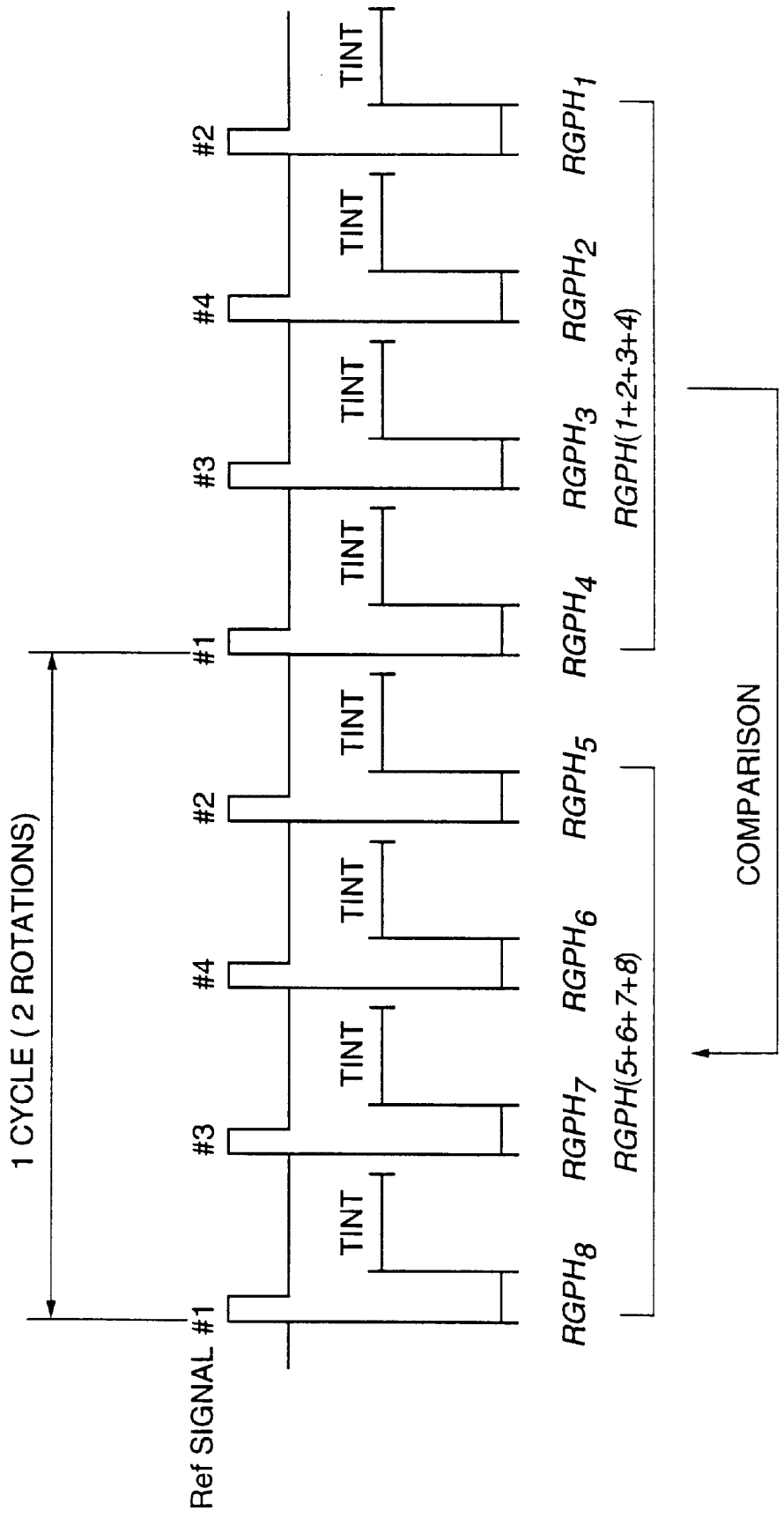
FIG. 19 is a timing chart describing a misfire diagnosis performed by the misfire diagnosis apparatus.

RGPH(5+6+7+8) is a simplified expression for $RGPH_5+RGPH_6+RGPH_7+RGPH_8$, and RGPH(1+2+3+4) is a simplified expression for $RGPH_1+RGPH_2+RGPH_3+RGPH_4$. As shown in FIG. 19, RGPH(1+2+3+4) and RGPH(5+6+7+8) are the sum totals of RGPHS for all cylinders per cycle. RGPH(5+6+7+8) is the value of RGPH(1+2+3+4) for the immediately preceding cycle.

Herein, the reason for checking the shift of the ring gear position in the TINT measurement by comparing RGPH(1+2+3+4) and RGPH(5+6+7+8) will be explained.

In order to check whether or not the ring gear position in the TINT measurement has shifted, it is sufficient to compare the Pos signal phase monitor value RGPHS for one cylinder with its value in the immediately preceding cycle for the same cylinder. It is also possible to check whether or not the ring gear position in the TINT measurement has shifted by comparing with the value of RGPHS two or more cycles previous to the current cycle, but checking time is shortest and control response is highest if the value in the immediately preceding cycle is used. However, in an engine wherein the appearance of the Ref signal in cylinder #1 and the input timing of a Pos signal are close to each other, the timing of the Ref signal in cylinder #1 easily shifts beyond the Pos signal due to vibration of the crankshaft or cam shaft, and even when there is no noise input or detection error of the magnetic pickup 5, the Pos signal phase monitor value may still fluctuate. In this case, it is impossible to correctly perform a check on the shift of the ring gear position in the TINT measurement.

To avoid this, RGPHS for a plurality of cylinders may be compared with the same value in the immediately preceding cycle. In this regard, the following comparison patterns may for example be used:

(1) RGPH(1+2) and RGPH(5+6)
(2) RGPH(1+2+3) and RGPH(5+6+7)
(3) RGPH(1+2+3+4) and RGPH(5+6+7+8)

However, it must be considered not only whether the appearance of the Ref signal in cylinder #1, but also that of the Ref signal in the remaining three cylinders, is close to the input timing of a Pos signal. In the case of a four cylinder engine, it is highly improbable that the appearance of the Ref signal in each of the four cylinders will be close to the input timing of a Pos signal. Also, even when the appearance of the Ref signal in a given cylinder is close to the input timing of a Pos signal, the effect on the determination result obtained by the above comparison is less the larger the sampling number of RGPHS. Hence the reliability of the determination result is highest in the case of pattern (3) above which has the largest sampling number.

Next, the determination value HAZURE is herein set to 3. In any cylinder, when the appearance of the Ref signal and the input of Pos signals are far apart, the value of HAZURE may be 4. However, when the appearance of the Ref signal and the input timing of a Pos signal in a given cylinder are close, the Ref signal for that cylinder may appear before or after the input of the Pos signal. In such a case, even when the engine is rotating uniformly, RGPHS may decrease by 1. The value of RGPHS may also change due to input of noise. Hence, the determination value HAZURE is set to 3. To allow still more tolerance, HAZURE can be set to 2. The value of HAZURE described above applies to a four cylinder engine, and the value of HAZURE for a six cylinder engine will be different.

In the step S129 of FIG. 18, it is determined that the position of the ring gear 4 in the TINT measurement is shifted when |RGPH(5+6+7+8)−RGPH(1+2+3+4)|≧HAZURE. In this case, a tooth position determining flag HAZUNG is set to "1" in a step S130. This tooth position determining flag HAZUNG is reset to "0" when the ignition switch is switched from OFF to ON. In the case of a six cylinder engine, |RGPH(7+8+9+10+11+12)−RGPH(1+2+3+4+5+6)| is compared with HAZURE2.

In a step S131, the average value RGISSA, integral number of times NRGPHS and integral value NRGPHS used in the tooth position check control process of FIGS. 16A, 16B are cleared, and in a step S132, a learnt value usage permission flag is reset to "0".

Further, in the tooth position check control process of FIGS. 16A, 16B, the step S101 is included as a condition for checking the tooth position of the ring gear 4. In the step S101 it is determined whether or not the process has experienced the completion after engine startup, and only when it has not, the process proceeds to the step S111 and subsequent steps. The process is performed each time a Ref signal is input, but the correction of the ring gear tooth position is performed only once after engine startup.

HAZUNG=1 in the step S111 is also included as a condition for checking the tooth position of the ring gear 4. Consequently in this misfire diagnosis apparatus, the processing of the step S85 and subsequent steps is permitted only when there is a shift of the tooth position of the ring gear 4 in the TINT measurement. In other words, any shift of the tooth position of the ring gear 4 in the TINT measurement is promptly checked, and when there is a shift, the tooth position of the ring gear 4 in the TINT measurement is corrected.

Also in this tooth position correction control, after performing a correction such that the tooth position of the ring gear 4 in the TINT measurement is the same as on the immediately preceding occasion when the vehicle was running (steps S107, S108, S109 and S110), there should no longer be any shift of the tooth position of the ring gear in the TINT measurement. The tooth position shift determining flag HAZUNG is therefore reset to "0" in a step S113.

Further, in the process of computing the TINT correction coefficient learnt value of FIG. 8, HAZUNG=0 is added as another correction coefficient computation condition (step S46). This is because when there is no shift in the tooth position of the ring gear 4 in the TINT measurement, or when the tooth position of the ring gear in the TINT measurement has been corrected, HAZUNG=0. Hence by the above processing, the effect of an error due to a shift in the position of the ring gear 4 in the TINT measurement on the TINT correction coefficient learnt value is eliminated, and the precision of the TINT correction coefficient learnt value is enhanced.

Next, the steps S127 and S128 of FIG. 18 will be described. If the tooth position of the ring gear 4 in the TINT measurement is checked by the process of FIG. 18 immediately after correcting the tooth position of the ring gear in the TINT measurement by the process of FIGS. 16A, 16B, it will be incorrectly determined that the tooth position is shifted. These steps are therefore provided to prevent this incorrect determination, as will now be described.

According to the above process, if RGPHS is reduced from 4 to 3 due to noise input as shown in FIG. 17C and processing is performed to correct the shift of the tooth position of the ring gear 4 in the TINT measurement, RGHPS returns from 3 to 4 as shown in FIG. 17D.

However FIGS. 17A–17D show the case when the predetermined value CNTRGC=1. Herein, provided that there is no fresh input of noise, the value of RGPHS continues to be 3, 3, 3, 3 until the tooth position correction procedure is performed, and continues to be 4, 4, 4, 4 immediately after the tooth position correction procedure is performed. In this case, RGPH$_1$=RGPH$_2$=RGPH$_3$=RGPH$_4$=4, and RGPH$_5$=RGPH$_6$=RGPH$_7$=RGPH$_8$=3. Therefore, |RGPH(5+6+7+8)−RGPH(1+2+3+4)|=|3×4−4×4|=16−12=4, and |RGPH(5+6+7+8)−RGPH(1+2+3+4)|>HAZURE (=3).

As a result, if the tooth position of the ring gear in the TINT measurement is checked immediately after the tooth position of the ring gear in the TINT measurement is corrected, it is incorrectly determined that the tooth position has again shifted although the tooth position of the ring gear has only just been corrected.

Therefore, it is determined whether or not the TINT measurement interval was corrected, i.e. whether the tooth position of the ring gear in the TINT measurement was corrected in the step S127, and when it was so corrected, the routine does not proceed to the processing of the step S129 until the engine has performed four rotations after correction in the step S128.

The reason why four engine rotations were set as the elapsed time after correction in the step S128 is as follows. RGPHS data for two cycles, i.e. four engine rotations, is used in the comparison of the step S129, so if at least four engine rotations are allowed to occur from when the tooth position of the ring gear in the TINT measurement was corrected, there is no risk that incorrect data due to correction processing of the tooth position will remain in any of the parameters RGPH$_1$–RGPH$_8$.

In the aforesaid description, Pos signals were counted based on the appearance of the Ref signal, i.e. based on the point at which input of the Ref signal to the control unit 7 starts, but Pos signals may be counted also based on the point at which input of the Ref signal to the control unit 7 stops.

Also the Ref signal w as generated according to rotation of the cam shaft and the Pos signals were generated according to rotation of the crankshaft, however all the signals may be generated according to rotation of the same shaft.

Figure 20:
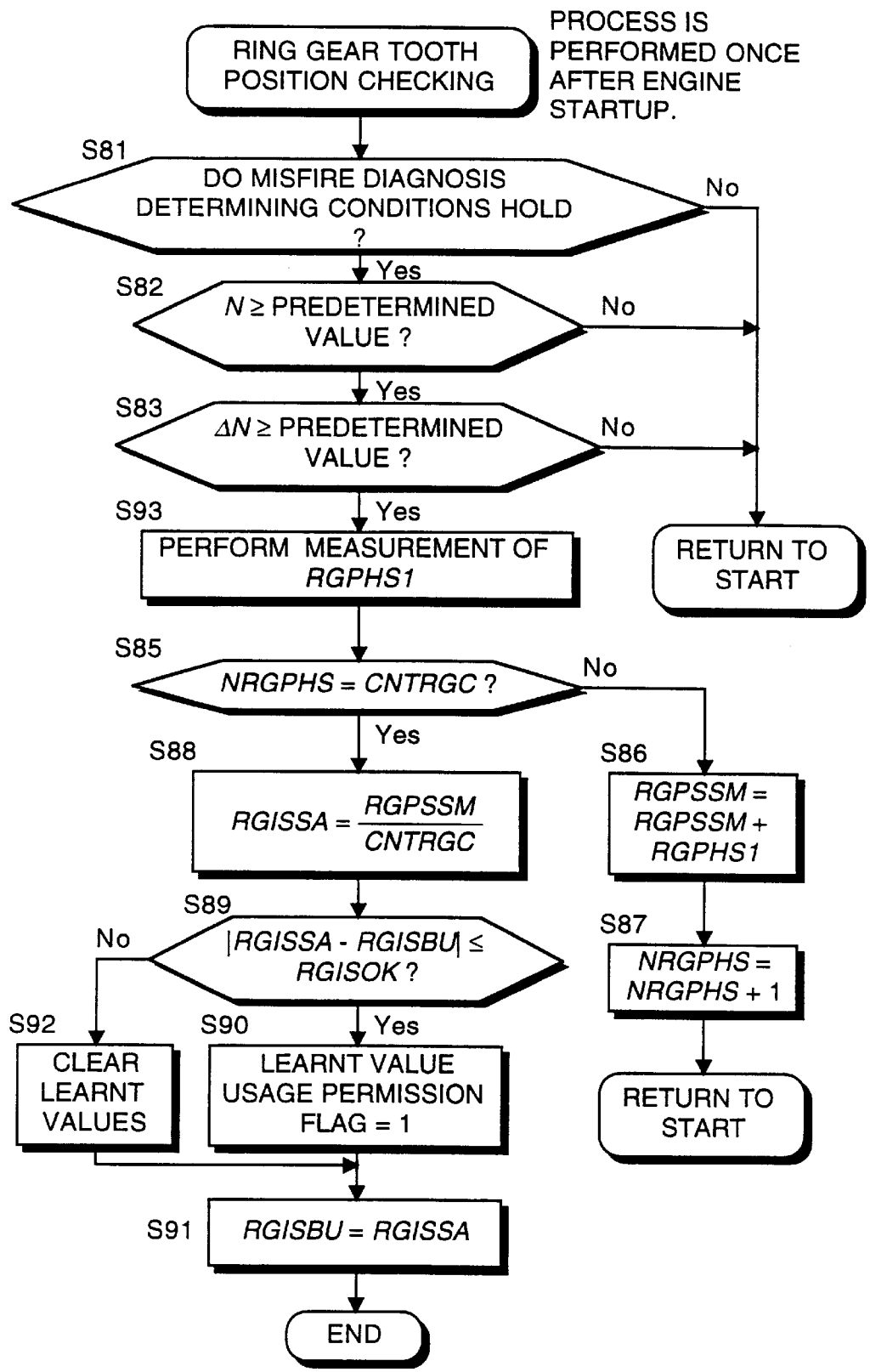
FIG. 20 is a flow chart describing a process for checking the ring gear tooth position according to another embodiment of this invention.

FIG. 20 shows another embodiment of this invention.

A According to this embodiment, the steps S101 and S111 are removed from the flowcharts of FIGS. 16A, 16B, a step 93 is provided instead of the step S84 and a step S92 is provided instead of the steps S105–S112.

In other words, the correction part of the process is eliminated from the checking and correction of the ring gear tooth position in FIGS. 16A, 16B, and when a shift is detected in the ring gear position, the TINT correction coefficient learnt value is cleared in the step S92. RGPHS in this embodiment is measured form the appearance of the Ref signal in cylinder #1 as RGPHS1.

According to this embodiment, once the learnt value is cleared, a corrected TINT calculation is not performed until the learnt value $RKTI_i$ is again computed in the process of FIG. 8. During this time, the precision of the misfire determination declines, but incorrect determination of a misfire due to a shift of the ring gear position is prevented.

The embodiments of this invention in which an exclusive property or privilege is claimed are defined as follows:

1. An engine misfire diagnosis apparatus which measures the time corresponding to a combustion process in each cylinder of a multi-cylinder engine, said engine having an operation cycle comprising a series of said combustion processes executed in a specific order in the multiplicity of the cylinders, and detects a misfire in a cylinder based on a change of said time, said apparatus comprising:

a sensor for detecting a unit rotation angle of said engine and outputting a Pos signal corresponding thereto;

a sensor for detecting a specific stroke position of each cylinder and outputting a Ref signal corresponding thereto; and a controller connected to said unit rotation angle sensor and said specific stroke position sensor, said controller functioning to:

set a start point of a misfire determining interval for each cylinder by specifying a number of Pos signals starting from the appearance of a Ref signal in a specific cylinder;

measure an elapsed time from said start point until a preset number of Pos signals has been counted;

correct said elapsed time by a learned value;

determine a misfire in a cylinder based on the elapsed time after correction;

count a number RGPHS of Pos signals from the Ref signal for each cylinder to said start point for each cylinder in a first operation cycle of said engine;

calculate a sum total of the number RGPHS counted in the first operation cycle;

count a number of RGPHS of Pos signals from the Ref signal for each cylinder to said start point for each cylinder in a second operation cycle of said engine different from the first operation cycle;

calculate a sum total of the number RGPHS counted in the second operation cycle;

calculate a difference of the sum total of the number RGPHS counted in the first operation cycle and the sum total of the number RGPHS counted in the second operation cycle; and prevent correction of said elapsed time when said difference does not satisfy a given condition.

2. A misfire diagnosis apparatus as defined in claim 1, wherein said controller is further functioning to set the second operation cycle in succession to the first operation cycle.

3. A misfire diagnosis apparatus as defined in claim 1, wherein said unit rotation angle sensor comprises a sensor for detecting the passage of teeth of a ring gear linked to a crankshaft of the engine and outputting a Pos signal corresponding thereto.

4. A misfire diagnosis apparatus as defined in claim 1, wherein said controller functions to set said start point of said misfire determining interval for each cylinder by setting a measuring start point for said specific cylinder by counting a first predetermined number of Pos signals from a Ref signal in said specific cylinder, counting a second predetermined number of Pos signals from said measuring start point, setting a measuring start point for a following cylinder by counting a third predetermined number of Pos signals following the counting of said second predetermined number of Pos signals, and respectively setting a measuring start point for cylinders other than said specific and following cylinders by alternately counting said second predetermined number of Pos signals and said third predetermined number of Pos signals from the measuring start point for said following cylinder.

5. A misfire diagnosis apparatus as defined in claim 1, wherein said controller further functions to compute an average value of the number RGPHS of Pos signals per cylinder in the first operation cycle of said engine from the sum total of said number RGPHS of Pos signals in the first operation cycle of said engine, compute an average value of the number RGPHS of Pos signals per cylinder in the second operation cycle of said engine from the sum total of said number RGPHS of Pos signals in the second operation cycle of said engine, correct a start point of a misfire determining interval for a cylinder based on a difference between said average values in the first operation cycle and second operation cycle of said engine and release the preventing of said controller from correcting said elapsed time after correction of said start point.

6. A misfire diagnosis apparatus as defined in claim 5, wherein said controller further functions to stop calculation of the difference between the sum total of the number RGPHS counted in the first operation cycle and the sum total of the number RGPHS counted in the second operation cycle, for a predetermined number of the operation cycles after correction of said start point.

7. A misfire diagnosis apparatus as defined in claim 5, wherein said controller further functions to correct a start point of a misfire determining interval for a cylinder by comparing an absolute value of said difference between said average values in the first operation cycle and the second operation cycle of said engine with a reference value, and correcting said second predetermined number based on said difference when said absolute value is larger than the reference value.

8. An engine misfire diagnosis apparatus which measures the time corresponding to a combustion process in each cylinder of a multi-cylinder engine, said engine having an operation cycle comprising a series of said combustion processes executed successively in the multiplicity of the cylinders, and detects a misfire in a cylinder based on a change of said time, said apparatus comprising:

means for outputting a Pos signal corresponding to a unit rotation angle of said engine, means for outputting a Ref signal corresponding to a specific stroke position of each cylinder, means for setting a start point of a misfire determining interval for each cylinder by specifying a number of Pos signals starting from the appearance of a Ref signal in a specific cylinder, a timer for measuring an elapsed time from said start point until a preset number of Pos signals has been counted, means for correcting said elapsed time by a learned value, means for determining a misfire in a cylinder based on the elapsed time after correction, means for counting a number RGPHS of Pos signals from the Ref signal for each cylinder to said start point for each cylinder in a first operation cycle of said engine, means for calculating a sum total of the number RGPHS counted in the first operation cycle, means for counting a number RGPHS of Pos signals from the Ref signal for each cylinder to said start point for each cylinder in a second operation cycle of said engine different from the first operation cycle, means for calculating a sum total of the number RGPHS counted in the second operation cycle, means for calculating a difference of the sum total of the number RGPHS counted in the first operation cycle and the sum total of the number RGPHS counted in the second operation cycle, and means for preventing said correcting means from correcting said elapsed time when said difference does not satisfy a given condition.

* * * * *